United States Patent
Cho et al.

(10) Patent No.: US 10,555,028 B2
(45) Date of Patent: Feb. 4, 2020

(54) IMAGE PROVIDING DEVICE

(71) Applicant: LG ELECTRONICS INC., Seoul (KR)

(72) Inventors: Jaeyoung Cho, Seoul (KR); Seunghwa Ahn, Seoul (KR); Sieun Ko, Seoul (KR); Ilgeun Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 532 days.

(21) Appl. No.: 15/309,791

(22) PCT Filed: May 8, 2015

(86) PCT No.: PCT/KR2015/004659
§ 371 (c)(1),
(2) Date: Nov. 8, 2016

(87) PCT Pub. No.: WO2015/170938
PCT Pub. Date: Nov. 12, 2015

(65) Prior Publication Data
US 2017/0142469 A1    May 18, 2017

(30) Foreign Application Priority Data

May 8, 2014   (KR) .................. 10-2014-0055014
Sep. 15, 2014  (KR) .................. 10-2014-0122278

(51) Int. Cl.
*H04N 21/4147*   (2011.01)
*H04N 21/485*    (2011.01)
(Continued)

(52) U.S. Cl.
CPC ... *H04N 21/4147* (2013.01); *H04N 21/23113* (2013.01); *H04N 21/4312* (2013.01);
(Continued)

(58) Field of Classification Search
CPC .... H04N 21/4147; H04N 5/775; H04N 9/802; H04N 21/23113; H04N 21/4312;
(Continued)

(56) References Cited

U.S. PATENT DOCUMENTS

2003/0112376 A1* 6/2003 Schnellenberger ...... H04N 5/44
                                                  348/725
2004/0250273 A1* 12/2004 Swix .................. H04N 21/4122
                                                  725/25
(Continued)

FOREIGN PATENT DOCUMENTS

JP   2012074771    4/2012
KR   1020100038486 4/2010
(Continued)

OTHER PUBLICATIONS

PCT International Application No. PCT/KR2015/004659, International Search Report dated May 8, 2015, 3 pages.

*Primary Examiner* — Cynthia M Fogg
(74) *Attorney, Agent, or Firm* — Lee, Hong, Degerman, Kang & Waimey

(57) ABSTRACT

The present invention relates to an image providing device. The image providing device, according to one embodiment of the present invention, comprises: a first circuit board having a broadcast receiving unit for receiving a broadcast signal, a first processor for signal-processing the received broadcast signal, and a first interface unit for transmitting the signal-processed broadcast signal to a second circuit board if there is a broadcast storage input; and the second circuit board having a second interface unit for receiving the broadcast signal from the first interface unit, a storage unit for storing the received broadcast signal, and a second processor for controlling the second interface unit and the storage unit, wherein the second processor drives a second OS differing from a first OS driven in the first processor and (Continued)

executes an application on the basis of the second OS. Thus, received broadcast content can be stably stored.

19 Claims, 37 Drawing Sheets

(51) Int. Cl.
*H04N 21/81* (2011.01)
*H04N 21/231* (2011.01)
*H04N 21/431* (2011.01)
*H04N 21/61* (2011.01)

(52) U.S. Cl.
CPC ......... *H04N 21/485* (2013.01); *H04N 21/818* (2013.01); *H04N 21/8173* (2013.01); *H04N 21/6118* (2013.01); *H04N 21/6125* (2013.01)

(58) Field of Classification Search
CPC .............. H04N 21/443; H04N 21/485; H04N 21/8173; H04N 21/818; H04N 21/4334; H04N 21/4622; H04N 7/17318; H04N 21/4882; H04N 21/4424; H04N 21/4223; H04N 21/6125; H04N 21/8126; H04N 5/4403; H04N 21/2665; H04N 21/43615; H04N 5/76; H04N 21/4383; H04N 21/4432; H04N 21/6143; H04N 21/6175; H04N 21/6543; H04N 5/44; H04N 21/4263; H04N 21/4307; H04N 21/231; H04N 21/274; H04N 21/442

USPC ......................................................... 725/59
See application file for complete search history.

(56) References Cited

U.S. PATENT DOCUMENTS

| | | | |
|---|---|---|---|
| 2005/0010671 A1* | 1/2005 | Grannan | H04L 12/2812 709/229 |
| 2005/0012563 A1* | 1/2005 | Kramer | H04H 60/372 333/125 |
| 2005/0097279 A1* | 5/2005 | Nakanishi | G06F 3/0619 711/147 |
| 2007/0104456 A1* | 5/2007 | Craner | H04N 5/44543 386/291 |
| 2010/0325369 A1* | 12/2010 | Choi | G06F 9/5016 711/148 |
| 2013/0135528 A1* | 5/2013 | Nicu | H04N 5/4401 348/552 |
| 2014/0181725 A1* | 6/2014 | Yang | G06F 9/451 715/777 |
| 2014/0250462 A1* | 9/2014 | Yuen | H04N 21/4332 725/42 |
| 2014/0344862 A1* | 11/2014 | Cho | H04N 21/4826 725/46 |

FOREIGN PATENT DOCUMENTS

| | | |
|---|---|---|
| KR | 1020100137803 | 12/2010 |
| KR | 1020110064093 | 6/2011 |
| KR | 1020120064490 | 6/2012 |

* cited by examiner

IMAGE PROVIDING DEVICE

CROSS-REFERENCE TO RELATED APPLICATIONS

This application is the National Stage filing under 35 U.S.C. 371 of International Application No. PCT/KR2015/004659, filed on May 8, 2015, which claims the benefit of earlier filing date and right of priority to Korean Application Nos. 10-2014-0055014, filed on May 8, 2014, and 10-2014-0122278, filed on Sep. 15, 2014, the contents of which are all hereby incorporated by reference herein in their entirety.

TECHNICAL FIELD

The present invention relates to an image providing device, and more particularly, to an image providing device capable of stably storing received broadcast content.

BACKGROUND ART

An image providing device is an apparatus having a function to provide images viewable by a user. The user may watch a broadcast program through the image providing device. The image providing device provides a broadcast program selected by the user among broadcast signals transmitted from broadcast stations, and displays broadcast images on the display. Currently, broadcasting technology is transitioning from analog broadcasting to digital broadcasting around the world.

Digital broadcasting refers to broadcasting for transmitting digital images and voice signals. Compared to analog broadcasting, digital broadcasting is robust to external noises and thus suffers lower data loss. Further digital broadcasting is advantageous in terms of error correction, and provides high definition and clear images. Further, in contrast with analog broadcasting, digital broadcasting enables bidirectional services.

DISCLOSURE

Technical Problem

It is an object of the present invention to provide an image providing device capable of stably storing received broadcast content.

It is another object of the present invention to provide an image providing device capable of storing a plurality of broadcast signals.

Technical Solution

In accordance with an aspect of the present invention, the above and other objects can be accomplished by the provision of an image providing device including a first circuit board including a broadcast receiver to receive a broadcast signal, a first processor to perform signal processing on the received broadcast signal, and a first interface unit to transmit the signal-processed broadcast signal to a second circuit board when an input for saving broadcast is provided, and the second circuit board including a second interface unit to receive the broadcast signal from the first interface unit, a storage unit to store the received broadcast signal, and a second processor to control the second interface unit and the storage unit, wherein the second processor drives a second operating system (OS) different from a first OS driven by the first processor, and executes a second OS-based application.

In accordance with another aspect of the present invention, there is provided an image providing device including a first circuit board including a broadcast receiver to receive a plurality of broadcast signals, a first processor to perform signal processing on the plurality of received broadcast signals, and a first interface unit to transmit, to a second circuit board, a first broadcast signal among the signal-processed broadcast signals when an input for saving broadcast is provided, and a second interface unit to transmit, to the second circuit board, a second broadcast signal among the signal-processed broadcast signals, and the second circuit board including a third interface unit to receive the first broadcast signal from the first interface unit, a fourth interface unit to receive the second broadcast signal from the second interface unit, a storage unit to store the first and second received broadcast signals, and a second processor to control the third and fourth interface units and the storage unit.

Advantageous Effects

According to an embodiment of the present invention, an image providing device including a first circuit board including a broadcast receiver to receive a broadcast signal, a first processor to perform signal processing on the received broadcast signal, and a first interface unit to transmit the signal-processed broadcast signal to a second circuit board when an input for saving broadcast is provided, and the second circuit board including a second interface unit to receive the broadcast signal from the first interface unit, a storage unit to store the received broadcast signal, and a second processor to control the second interface unit and the storage unit. Thereby, received broadcast content may be stably stored in the storage unit of the second circuit board, which has a large storage space according to the before saving broadcast.

According to another embodiment of the present invention, an image providing device receives a plurality of broadcast signals through a first circuit board, transmits a first broadcast signal and second broadcast signal to the second circuit board be a different interface units among the plurality of broadcast signals, and store stuff first and second received broadcast signals through the second circuit board. Thereby, plural broadcast signals may be stored. Accordingly, user convenience may be enhanced.

In particular, the received broadcast content may be stably stored in the storage unit of the second circuit board, which has a large storage space.

The image providing device further includes a network interface unit to transmit at least one of the first and second received broadcast signals to an outside through the second circuit board. Thereby, broadcast may be watched through an external terminal in real time.

BEST MODE

Reference will now be made in detail to the preferred embodiments of the present invention, examples of which are illustrated in the accompanying drawings.

As used herein, the suffixes "module" and "unit" are added to simply facilitate preparation of this specification and are not intended to suggest special meanings or functions. Therefore, the suffixes "module" and "unit" may be used interchangeably.

Figure 1:
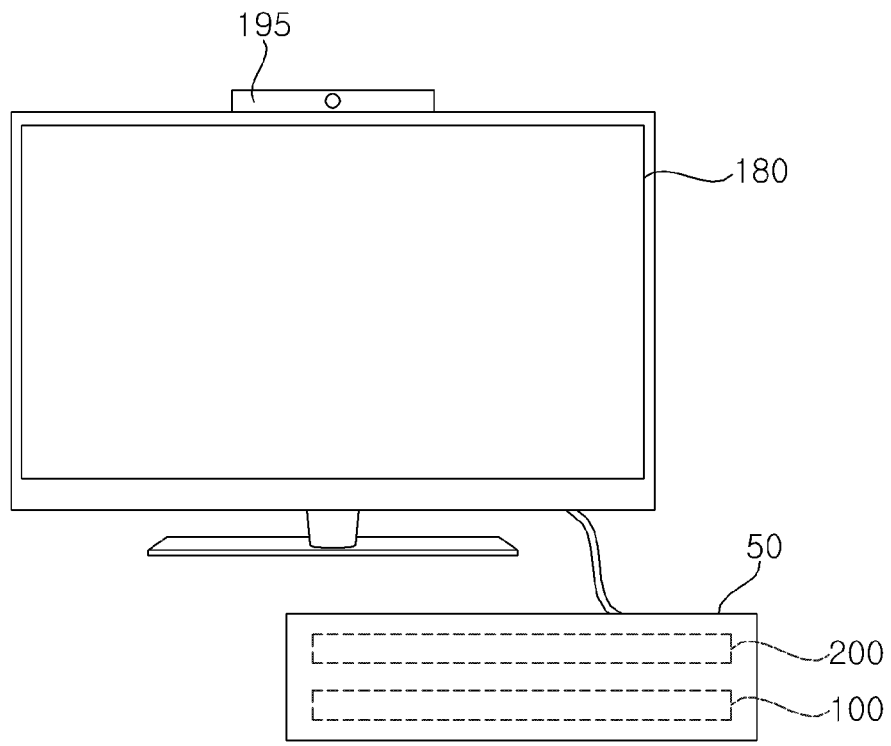
FIG. 1 illustrates an image providing device according to an embodiment of the present invention.

FIG. 1 illustrates an image providing device according to an embodiment of the present invention.

Referring to FIG. 1, an image providing device 50 according to an embodiment may include a first circuit board 100, which includes a broadcast receiver 105 (see FIG. 2), and a second circuit board 200, which includes a storage unit 240 (see FIG. 2) having a large storage capacity.

The first circuit board 100 and the second circuit board 200 may be detachably provided in the image providing device 50.

The first circuit board 100 and the second circuit board 200 may exchange data with each other via a first interface unit 125 and a second interface unit 225.

The second circuit board 200 may transmit, to the first circuit board 100, a signal for a background image or an image or content reproduced by the second circuit board 200, and the first circuit board 100 may transmit, to the second circuit board 200, a control signal or a broadcast signal or image to be stored.

In particular, when an input for saving broadcast is provided, the first circuit board 100 may transmit a signal-processed broadcast signal or broadcast image to the second circuit board 200.

The first circuit board 100 may be referred to as a TV board, and the second circuit board 200 may be referred to as a PC board.

In particular, components of the second circuit board 200 may be upgraded through a detachable structure.

According to an embodiment of the present invention, the image providing device 50 may provide a home screen including a TV screen and a PC screen as a user interface which may be conveniently used by the user.

The first circuit board 100 may be separated from the second circuit board 200. Thereby, when one of the two circuit boards, in particular, the second circuit board 200, malfunctions, broadcast images may be stably provided through the first circuit board 100.

The processor of the second circuit board 200 is better than the processor of the first circuit board 100 in terms of processing speed, processing capacity, and the like. Thereby, the second circuit board 200 may be responsible for high-performance functions, for example, image capture through a camera, gesture recognition, Web connection, and executing games. In addition, the second circuit board 200 may provide the first circuit board 100 with screens according to the respective functions.

In FIG. 1, the image providing device 50 is illustrated as including neither a display 180 nor a camera 195. However, the image providing device 50 according to an embodiment of the present invention may conceptually include the display 180. If the display 180 is included in the image providing device 50, the image providing device 100 may be referred to as an image display device.

The display 180 may be a PDP, an LCD display, an OLED display, a flexible display, or a 3D display.

The display 180 may be configured by a touchscreen to be used not only as an output device but also as an input device.

The camera 195 captures an image of the user. The camera 195 may be implemented by one camera. However, embodiments of the present invention are not limited thereto. The camera 195 may be implemented by a plurality of the cameras. The camera 195 may be embedded in an upper portion of the display 180 or may be separately disposed. Image information captured by the camera 195 may be input to the image providing device 50.

Figure 2:
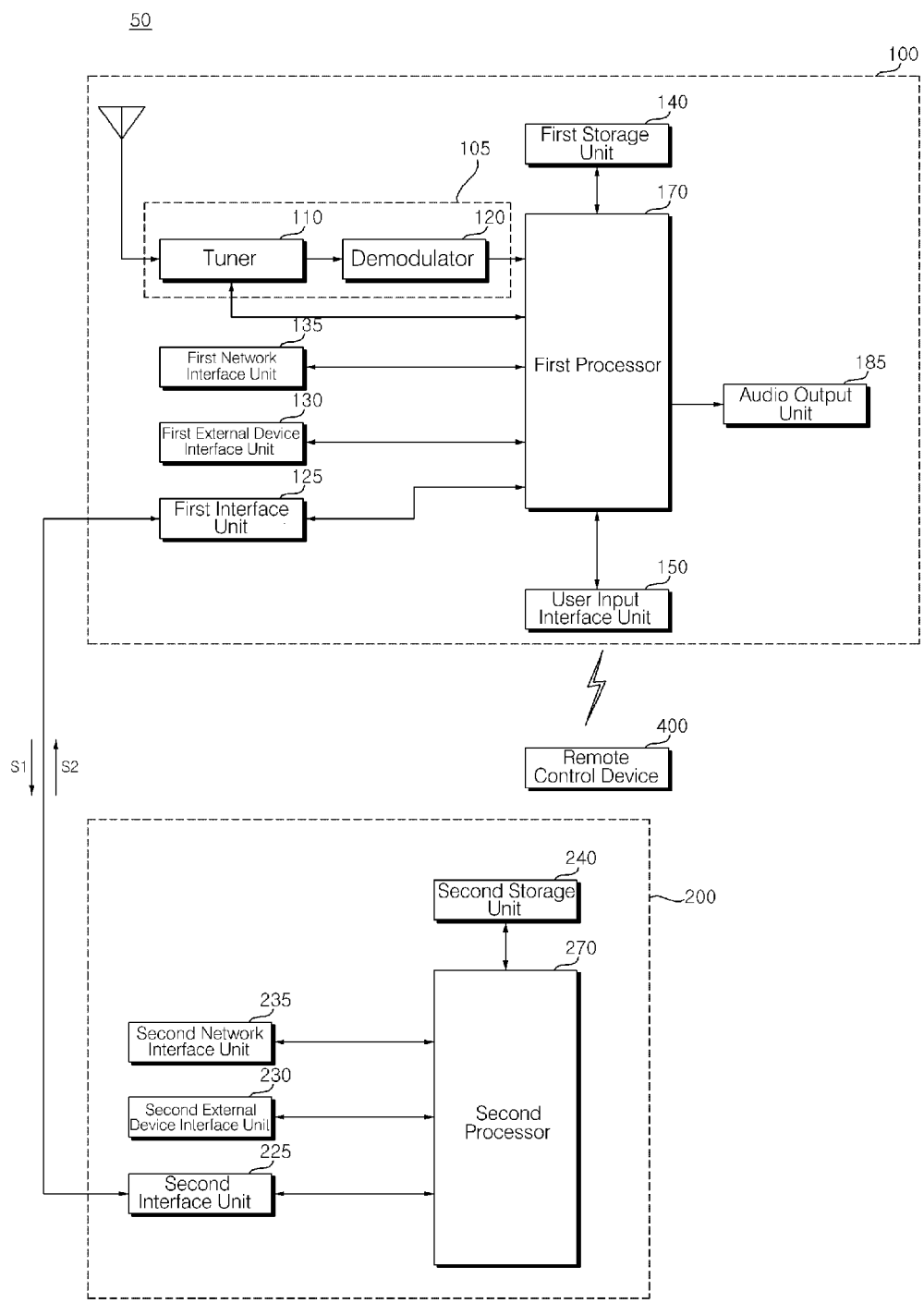
FIG. 2 is an internal block diagram illustrating an image providing device according to an embodiment of the present invention.

FIG. 2 is an internal block diagram illustrating an image providing device according to an embodiment of the present invention.

Referring to FIG. 2, the image providing device 50 according to an embodiment may include a first circuit board 100 and a second circuit board 200.

The first circuit board 100 may include a broadcast receiver 105, a first interface unit 125, a first external device interface unit 130, a first network interface unit 135, a first storage unit 140, a user input interface unit 150, a first processor 170, and an audio output unit 185.

The second circuit board 100 may include a second interface unit 225, a second external device interface unit 230, a second network interface unit 235, a second storage unit 240, and a second processor 270.

The broadcast receiver 105 may include a tuner 110 and a demodulator 120. While the broadcast receiver 105 is illustrated as not having the first network interface unit 135, it is possible for the broadcast receiver 105 to further include the first network interface unit 135. Alternatively, the broadcast receiver 105 may include only the first network interface unit 135 without including the tuner 110 and the demodulator 120.

In contrast with the example of the figure, the broadcast receiver 105 may further include the first external device interface unit 135. For example, a broadcast signal from an external set-top box may be received through the first external device interface unit 135.

The tuner 110 selects a channel selected by a user from among radio frequency (RF) broadcast signals received through an antenna 50 or an RF broadcast signal corresponding to all pre-stored channels. In addition, the tuner 110 converts the selected RF broadcast signal into a middle-frequency signal, a baseband image, or a voice signal.

Meanwhile, the tuner 110 may sequentially select an RF broadcast signal for all broadcast channels stored through the channel memorization function, from among RF broadcast signals received through the antenna, and convert the same into a middle-frequency signal, a baseband image, or a voice signal.

To receive broadcast signals of a plurality of channels, a plurality of tuners 110 may be provided. Alternatively, a single tuner to receive a plurality of channels simultaneously may be provided.

The demodulator 120 receives and demodulates the DIF signal converted by the tuner.

After performing demodulation and channel decoding, the demodulator 120 may output a stream signal (TS). Herein, the stream signal may be a signal obtained by multiplexing an image, voice or data signal.

The stream signal output from the demodulator 120 may be input to the first processor 170. After performing demultiplexing and image/voice signal processing, the first processor 170 outputs an image to the display 180 and voice to the audio output unit 185.

The first interface unit 125 exchanges data with the second interface unit 225 of the second circuit board 200.

In particular, when an input for saving broadcast is provided, the first processor 170 may transmit a signal-processed broadcast signal or broadcast image to the second interface unit 225 via the first interface unit 125.

The first interface unit 125 may receive a played broadcast signal or broadcast image from the second interface unit 225. Alternatively, the first interface unit 125 may receive a background image.

The first interface unit 125 may transmit a control signal for controlling the second circuit board 200.

The first interface unit 125 and the second interface unit 225 may perform high-definition multimedia interface (HDMI) communication.

The first external device interface unit 130 may transmit or receive data to or from a connected external device (not shown). To this end, the first external device interface unit 130 may include an A/V input/output unit (not shown) or a wireless communication unit (not shown).

The first external device interface unit 130 may be connected to external devices such as a DVD (digital versatile disc) player, a Blu-ray player, a game console, a camera, a camcorder, a computer (laptop), and a set-top box in a wired/wireless manner, and perform input/output operations with external devices.

The A/V input/output unit may receive image and voice signals input from an external device. The wireless communication unit may perform short-range wireless communication with other electronic devices.

The first external device interface unit 130 may include a USB terminal, a CVBS terminal, a component terminal, an S-video terminal, a DVI terminal, a high-definition multimedia interface (HDMI) terminal, an RGB terminal, and a D-SUB terminal.

The first network interface unit 135 provides an interface for connecting the image providing device 50 with a wired/wireless network including the Internet. For example, the first network interface unit 135 may receive content or data provided by a content provider or a network operator over a network.

The first storage unit 140 may store programs for processing and control of signals in the first processor 170, and also store a signal-processed image, voice signal or data signal.

The first storage unit 140 may function to temporarily store an image signal, a voice signal or a data signal input through the first external device interface unit 130. In addition, the first storage unit 140 may store information about a predetermined broadcast channel through the channel memorization function such as a channel map.

While it is illustrated in FIG. 2 that the first storage unit 140 is provided separately from the first processor 170, embodiments of the present invention are not limited thereto. The first storage unit 140 may be provided in the first processor 170.

The user input interface unit 150 may transmit a signal input by the user to the first processor 170 or transmit a signal from the first processor 170 to the user.

For example, the user input interface unit 150 may transmit/receive user input signals such as power on/off, channel selection, and screen window setting to/from the remote control device 400, deliver, to the first processor 170, user input signals input through local keys (not shown) such as a power key, a channel key, a volume key, or a setting key, deliver, to the first processor 170, user input signals input through a sensor unit (not shown) configured to sense gesture of the user, or transmit a signal from the first processor 170 to the sensor unit (not shown).

The first processor 170 may demultiplex streams input through the tuner 110, demodulator 120, network interface unit 135 or first external device interface unit 130, or process demultiplexed signals. Thereby, the first processor 170 may generate an output signal for outputting an image or voice.

An image signal image-processed by the first processor 170 may be input to the display 180 and an image corresponding to the image signal may be displayed. In addition, the image signal, which has been image-processed by the first processor 170, may be input to an external output device through the first external device interface unit 130.

A voice signal processed by the first processor 170 may be output to the audio output unit 185 in the form of sound. In addition, the voice signal processed by the first processor 170 may be input to an external output device through the first external device interface unit 130.

The first processor 170 may run a first OS, using the first OS-related data stored in the first storage unit 140. In addition, the first processor 170 may execute various applications which are based on the first OS.

For example, the first OS-based applications may include at least one of an application related to external input, a broadcast guide application, an application related to stored broadcast content, a Bluetooth application, a reservation application, a digital video recorder (DVR) application, a hotkey application, an application of Internet phone call service according to connection to a network, a VOD service application, a web album service application, a social networking service (SNS) application, a location-based service (LBS) application, a map application, a web search application, a game application, a schedule management application, and the like.

The first OS may be a UNIX (LINUX)-based OS, a Web-based OS, or the like.

Although not shown in FIG. 2, the first processor 170 may include a demultiplexer and an image processor. Details will be described with reference to FIG. 3 later.

The first processor 170 may control overall operations in the image providing device 50. The first processor 170 may control overall operations of the respective units on the first circuit board 100 in the image providing device 50.

For example, the first processor 170 may control the tuner 110 to tune in RF broadcasting corresponding to a channel selected by the user or a pre-stored channel.

The first processor 170 may control the image providing device 50 according to a user command input through the user input interface unit 150 or an internal program.

The first processor 170 may control the display 180 to display an image. Herein, the image displayed on the display 180 may be a still image, a moving image, a 2D image, or a 3D image.

The first processor 170 may recognize the location of the user based on an image captured by the camera 195. For example, the first processor 170 may recognize the distance between the user and the image providing device 50 (i.e., a z-axis coordinate). Additionally, the first processor 170 may recognize an x-axis coordinate and y-axis coordinate on the display 180 corresponding to the location of the user.

Although not shown in the figure, a channel browsing processor for generating a thumbnail image corresponding to a channel signal or an external input signal may be further provided. The channel browsing processor may receive input of a stream signal (TS) output from the demodulator 120 or a stream signal output from the first external device interface unit 130, and extract an image from the input stream signal to generate a thumbnail image. The generated thumbnail image may be subjected to stream decoding together with a decoded image and then input to the first processor 170. Using the input thumbnail image, the first processor 170 may display a thumbnail list including a plurality of thumbnail images on the display 180.

The audio output unit 185 receives a voice signal processed by the first processor 170 and outputs voice.

A power supply (not shown) supplies power to overall parts of the image providing device 50. In particular, the power supply (not shown) may supply power to the first processor 170, which may be implemented in the form of a system on chip (SOC), the display 180 for display of images, and the audio output unit 185 for providing audio output.

Specifically, the power supply (not shown) may include a converter to convert alternating current (AC) into direct current (DC) and a DC-DC converter to change the level of the DC power.

The remote control device 400 transmits a user input to the user input interface unit 150. To this end, the remote control device 400 may employ Bluetooth, radio frequency (RF) communication, infrared (IR) communication, ultra-wideband (UWB), or ZigBee. In addition, the remote control device 400 may receive an image signal, a voice signal or a data signal from the user input interface unit 150, and display or output the same.

The image providing device 50 may be a fixed or mobile digital broadcast receiver capable of receiving digital broadcast services.

The second interface unit 225 in the second circuit board 200 exchanges data with the first interface unit 125 of the first circuit board 100.

In particular, when an input for saving broadcast is provided, the second interface unit 225 may receive a signal-processed broadcast signal or broadcast image from the first interface unit 125 of the first circuit board 100.

When an input for playing broadcast is provided, the second interface unit 225 may transmit a signal-processed broadcast signal or broadcast image to the first interface unit 125 of the first circuit board 100.

To provide the Home screen, the second interface unit 225 may transmit a background image to the first interface unit 125 of the first circuit board 100.

The second interface unit 225 may receive a control signal for controlling the second circuit board 200 from the first interface unit 125 of the first circuit board 100.

The second external device interface unit 230 may transmit or receive data to or from the connected external device (not shown). To this end, the second external device interface unit 230 may include an A/V input/output unit (not shown) or a wireless communication unit (not shown).

The second external device interface unit 230 may be connected to an external device such as a digital versatile disc (DVD) player, a Blu-ray player, a game console, a camera, a camcorder, a computer (laptop), or a set-top box in a wired/wireless manner, and perform an input/output operation with the external device.

The second external device interface unit 230 may include a USB terminal, a CVBS terminal, a component terminal, an S-video terminal, a DVI terminal, a high-definition multimedia interface (HDMI) terminal, an RGB terminal, and a D-SUB terminal.

The second network interface unit 235 provides an interface for connecting the image providing device 50 to a wired/wireless network including the Internet. For example, the second network interface unit 235 may receive content or data provided by an Internet or content provider or a network operator over a network.

The second storage unit 240 may store programs for signal processing and control in the second processor 270, or store signal-processed image, voice or data signals.

The second storage unit 240 may also function to temporarily store image, voice or data signals input from the second external device interface unit 230.

The second processor 270 may perform signal processing on external input signals through the second external device interface unit 230, and generate and output a signal for image output or voice output.

The second processor 270 may be responsible for high-performance functions, for example, image capture through a camera, gesture recognition, Web connection, and executing games. In addition, the second processor 270 may provide the first circuit board 100 with screens according to the respective functions.

A voice signal processed by the second processor 270 may be transmitted to the first circuit board 100 via the second interface unit 225, and output from the first interface unit 125 in the first circuit board 100 in the form of sound.

Besides, the second processor 270 may control overall operations of the image providing device 50. In particular, the second processor 270 may control overall operations of the respective units in the second circuit board 200.

The second processor 270 may recognize the position of the user based on an image captured through the camera 195. For example, the second processor 270 may recognize a distance (a z-axis coordinate) between the user and the image providing device 50. Additionally, the second processor 270 may recognize an x-axis coordinate and y-axis coordinate in the display 180 corresponding to the position of the user.

The second processor 270 may run a second OS using data related to the second OS stored in the second storage unit 240. In addition, the second processor 270 may execute various applications which are based on the second OS.

Herein, the second OS may be different from the first OS and may be an OS which is based on Windows, Mac, UNIX, or the like.

For example, the second OS-based applications may include at least one of a news-related application, an SNS-related application, a mail-related application, a document preparation-related application, an image playback-related application, an audio playback-related application, a web browser application, a game application, a map application, a schedule management application, and the like.

The block diagram of the image providing device 50 shown in FIG. 2 is simply illustrative. Constituents of the block diagram may be integrated, added or omitted according to the specifications of the image providing device 50. That is, two or more constituents may be combined into one constituent, or one constituent may be subdivided into two or more constituents, when necessary. In addition, the function performed by each block is simply illustrative, and it should be noted that specific operations or devices of the blocks do not limit the scope of the present invention.

Figure 3:
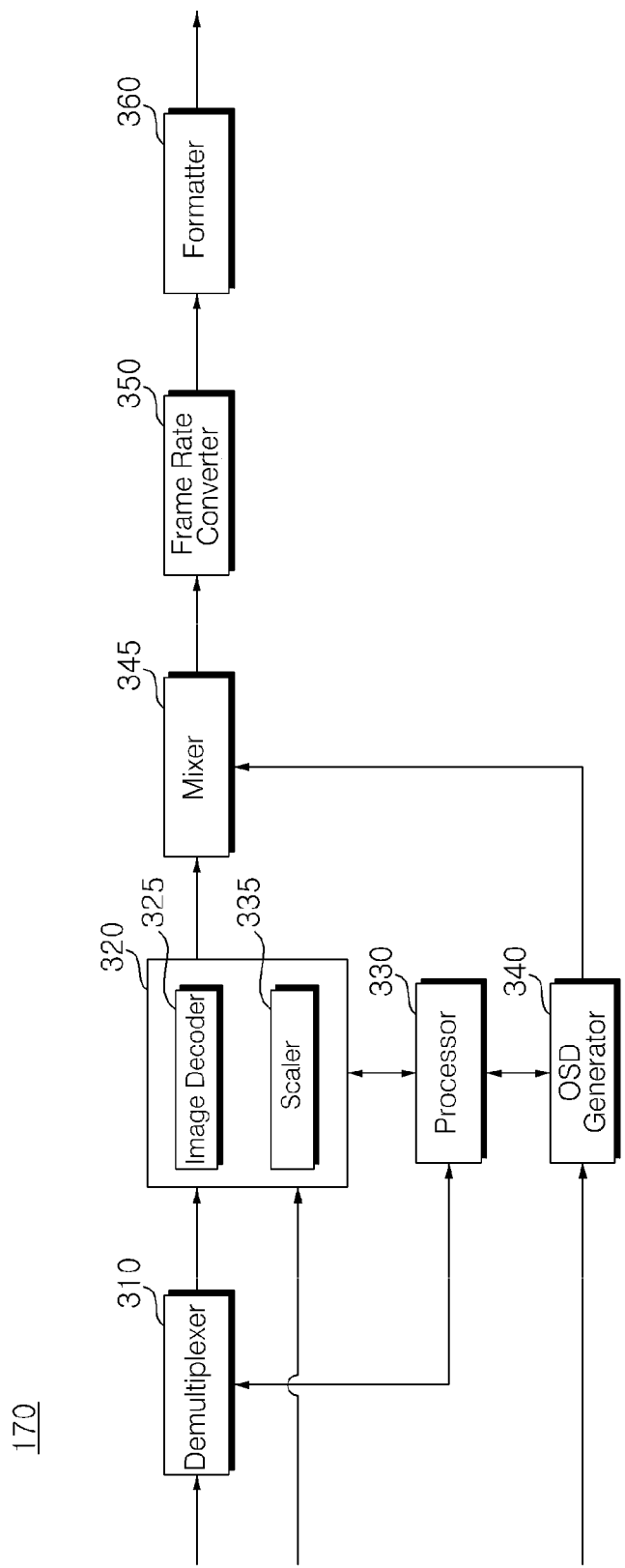
FIG. 3 is an internal block diagram illustrating a first processor of FIG. 2.

FIG. 3 is an internal block diagram illustrating the first processor of FIG. 2.

Referring to FIG. 3, the first processor 170 according to an embodiment of the present invention may include a demultiplexer 310, an image processor 320, a processor 330, an OSD generator 340, a mixer 345, a frame rate converter 350, and a formatter 360.

The demultiplexer 310 demultiplexes an input stream. For example, when MPEG-2 TS is input, the demultiplexer 310 may demultiplex the same to separate the stream into an image signal, a voice signal and a data signal. Herein, the stream signal input to the demultiplexer 310 may be a stream signal output from the tuner 110, the demodulator 120 or the first external device interface unit 130.

The image processor 320 may perform image processing on a demultiplexed image signal. To this end, the image processor 320 may include an image decoder 325 and a scaler 335.

The image decoder 325 decodes the demultiplexed image signal, and the scaler 335 scales the resolution of the decoded image signal such that the image signal can be output through the display 180.

The image decoder 325 may include decoders of various standards.

The processor 330 may control overall operation of the image providing device 50 or the first processor 170. For example, the processor 330 may control the tuner 110 to tune in to an RF broadcast corresponding to a channel selected by the user or a pre-stored channel.

In addition, the processor 330 may control the image providing device 50 according to a user command input through the user input interface unit 150 or an internal program.

The processor 330 may control data transmission with the first network interface unit 135 or the first external device interface unit 130.

The processor 330 may control operations of the demultiplexer 310, image processor 320 and OSD generator 340 in the first processor 170.

The OSD generator 340 generates an OSD signal automatically or according to user input. For example, the OSD generator 340 may generate a signal for display of various kinds of information in the form of graphic images or text on the screen of the display 180 based on a user input signal. The generated OSD signal may include various data including the user interface screen window of the image providing device 50, various menu screen windows, widgets, and icons.

The OSD generator 340 may generate a pointer which can be displayed on the display, based on a pointing signal input from the remote control device 400. In particular, the pointer may be generated by a pointing signal processor (not shown), and the OSD generator 340 may include the pointing signal generator. Of course, it is possible to provide the pointing signal processor (not shown) separately from the OSD generator 340.

The mixer 345 may mix the OSD signal generated by the OSD generator 340 with an image signal processed and decoded by the image processor 320. Herein, each of the OSD signal and the decoded image signal may include at least one of a 2D signal and a 3D signal. The mixed image signal is provided to the frame rate converter 350.

The frame rate converter (FRC) 350 may convert the frame rate of an input image. The FRC 350 may output the frame rate without performing separate frame rate conversion.

The formatter 360 may change the format of an input image signal to a predetermined format.

For example, the formatter 360 may arrange a left image frame and right image frame of a 3D image produced through frame rate conversion. The formatter 360 may output a synchronization signal Vsync to open the left eye glass or right eye glass of a 3D view apparatus (not shown).

The formatter 360 may change the format of a 3D image signal. For example, the formatter 360 may change the format of the 3D image signal to one of various 3D formats.

The formatter 360 may convert a 2D image signal into a 3D image signal. For example, the formatter 360 may detect an edge or a selectable object in a 2D image signal, and separate and generate the object according to the detected edge of the selectable object as a 3D image signal. In this case, the generated 3D image signal may be separated into a left image signal L and a right image signal R to be aligned.

An audio processor (not shown) in the first processor 170 may process a demultiplexed voice signal. To this end, the audio processor (not shown) may include various decoders.

The audio processor (not shown) in the first processor 170 may perform processing such as adjustment of bass, treble, and volume.

The data processor (not shown) in the first processor 170 may perform data processing on a demultiplexed data signal. For example, if the demultiplexed data signal is a coded data signal, the data processor (not shown) may decode the data signal. The coded data signal may be electronic program guide (EPG) information containing broadcast information such as a start time and end time of a broadcast program broadcast on each channel.

The block diagram of the first processor 170 shown in FIG. 3 is simply illustrative. Constituents of the block diagram may be integrated, added or omitted according to the specifications of the first processor 170.

In particular, the frame rate converter 350 and the formatter 360 may not be provided in the first processor 170. Instead, they may be provided individually or provided as one separate module.

Figure 4:
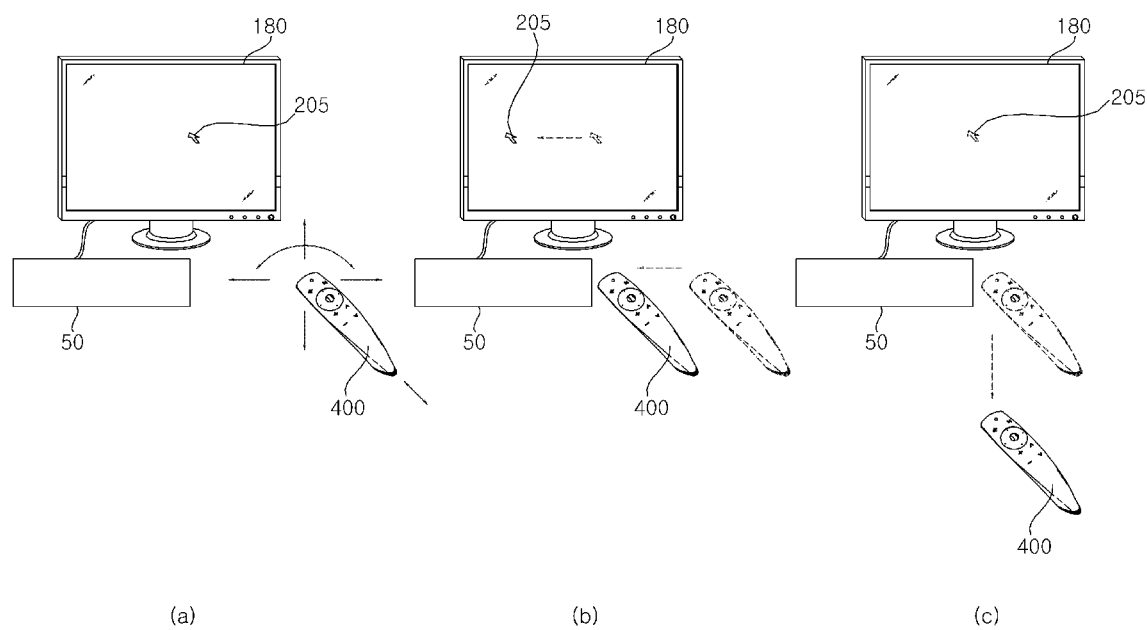
FIG. 4 illustrates a method for controlling the remote control device of FIG. 2.

FIG. 4 illustrates a method for controlling the remote control device of FIG. 2.

As shown in FIG. 4(a), a pointer 205 corresponding to the remote control device 400 may be displayed on the display 180.

The user may move the remote control device 400 up and down, left and right (FIG. 4(b)), or back and forth (FIG. 4(c)) or rotate the same. The pointer 205 displayed on the display 180 of the image providing device corresponds to movement of the remote control device 400. As shown in the figure, since the pointer 205 moves according to movement of the remote control device 400 in 3D space, the remote control device 400 may be referred to as a spatial remote control or a 3D pointing device.

FIG. 4(b) illustrates a case where the pointer 205 displayed on the display 180 moves to the left when the user moves the remote control device 400 to the left.

Information about movement of the remote control device 400 sensed through a sensor of the remote control device 400 is transmitted to the image providing device. The image providing device may calculate coordinates of the pointer 205 based on the information about the movement of the remote control device 400. The image providing device 50 may provide the pointer 205 such that the pointer 205 corresponds to the calculated coordinates. Thereby, the pointer 205 may be displayed on the display 180.

FIG. 4(c) illustrates a case where the user moves the remote control device 400 away from display 180 while pressing down a specific button on the remote control device 400. In this case, a selected area of the display 180 corresponding to the pointer 205 may be zoomed in and displayed with the size thereof increased. On the other hand, when the user moves the remote control device 400 closer to the display 180, the selected area may be zoomed out and displayed with the size thereof reduced. Alternatively, the selected area may be zoomed out when the remote control device 400 moves away from the display 180, and may be zoomed in when the remote control device 400 moves closer to the display 180.

Vertical and lateral movement of the remote control device 400 may not be recognized while the specific button on the remote control device 400 is pressed down. That is, when the remote control device 400 approaches or moves away from the display 180, vertical and lateral movements thereof may not be recognized, but only back-and-forth movement thereof may be recognized. If the specific button in the remote control device 400 is not pressed down, only the pointer 205 moves according to vertical and lateral movements of the remote control device 400.

The speed and direction of movement of the pointer 205 may correspond to the speed and direction of movement of the remote control device 400.

The user input interface unit 150 may receive a pointing signal from the remote control device 400, and the first processor 170 may provide the pointer 205 based on the received pointing signal, as shown in FIGS. 4(a) to 4(c).

Figure 5:
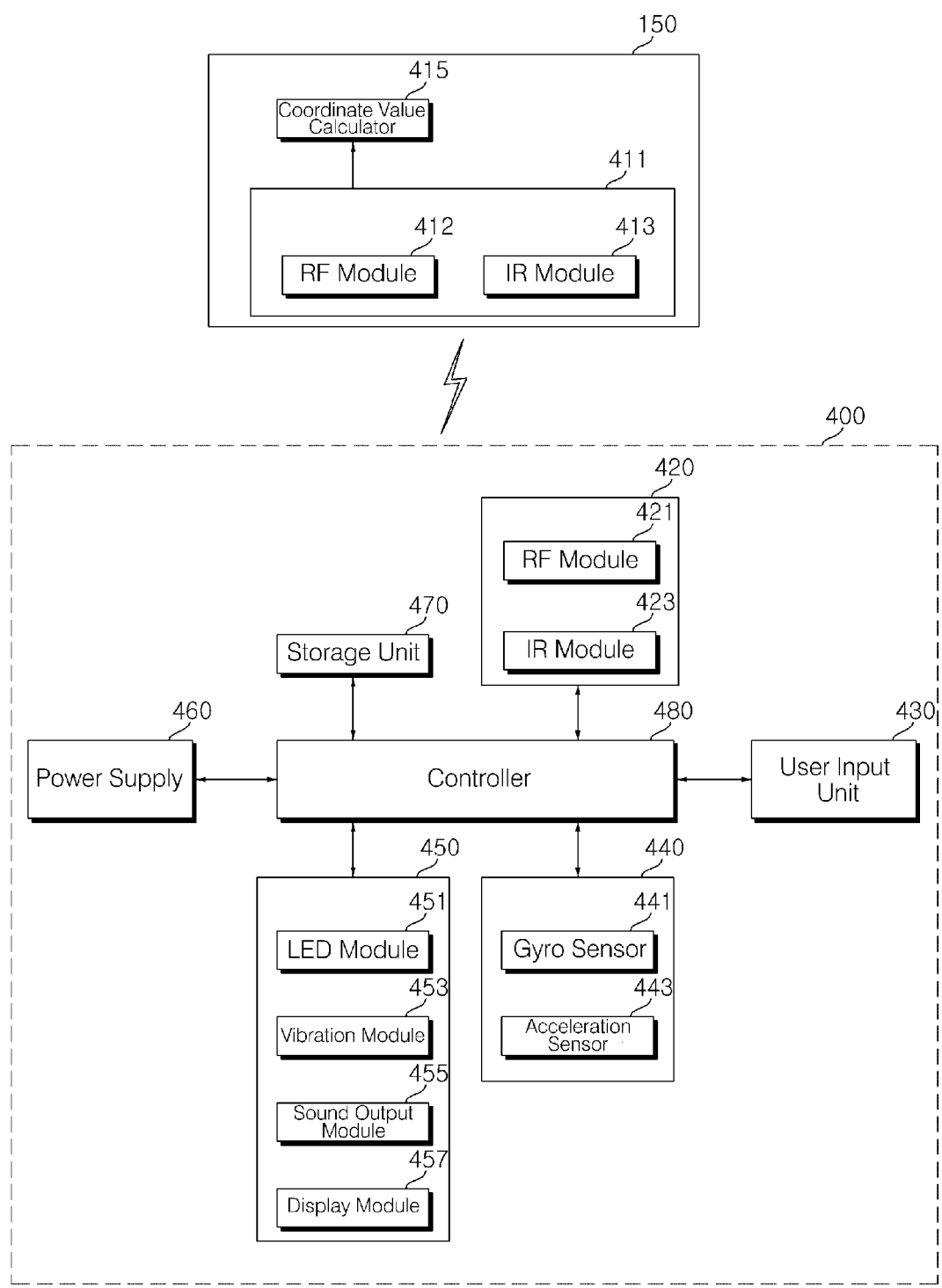
FIG. 5 is an internal block diagram illustrating the remote control device of FIG. 2.

FIG. 5 is an internal block diagram illustrating the remote control device of FIG. 2.

Referring to FIG. 4B, the remote control device 400 may include a wireless communication unit 420, a user input unit 430, a sensor unit 440, an output unit 450, a power supply 460, a storage unit 470, and a controller 480.

The wireless communication unit 420 may transmit and receive signals to and from the image providing device 50 according to embodiments of the present invention described above.

For example, the remote control device 400 may include an RF module 421 capable of transmitting and receiving signals to and from the image providing device 50 according to an RF communication standard. The remote control device 400 may further include an IR module 423 capable of transmitting and receiving signals to and from the image providing device 50 according to an IR communication standard.

The remote control device 400 may transmit a signal containing information about movement of the remote control device 400 to the image providing device 50 via the RF module 421.

In addition, the remote control device 400 may receive a signal from the image providing device 50 via the RF module 421. When necessary, the remote control device 400 may transmit commands related to power on/off, channel change, and volume change to the image providing device 50 via the IR module 423.

The user input unit 430 may include a keypad, a button, a touchpad, or a touchscreen. The user may input a command related to the image providing device 50 by manipulating the user input unit 430. If the user input unit 430 includes a hard key button, the user may input a command related to the image providing device 50 by pressing the hard key button. If the user input unit 430 includes a touchscreen, the user may input a command related to the image providing device 50 by touching a soft key on the touchscreen. The user input unit 430 may include various kinds of input means such as a scroll key and a jog key, but it should be noted that this embodiment does not limit the scope of the present invention.

The sensor unit 440 may include a gyro sensor 441 or an acceleration sensor 443. The gyro sensor 441 may sense information about movement of the remote control device 400.

For example, the gyro sensor 441 may sense information about movement of the remote control device 400 with respect to the X, Y and Z axes. The acceleration sensor 443 may sense information about the movement speed of the remote control device 400. The sensor unit 440 may further include a distance measurement sensor to sense a distance to the image providing device 50 or the display 180.

The output unit 450 may output an image signal or voice signal corresponding to manipulation of the user input unit 430 or a signal transmitted from the image providing device 50. The user may recognize, via the output unit 450, whether the user input unit 430 is manipulated or the image providing device 50 is controlled.

For example, the output unit 450 may include an LED module 451 configured to be turned on when signals are transmitted to and received from the image providing device 50 via the wireless communication unit 420, a vibration module 453 configured to generate vibration, a sound output module 455 configured to output sound, or a display module 457 configured to output an image.

The power supply 460 supplies power to the remote control device 400. If the remote control device 400 does not move for a predetermined time, the power supply 460 may stop supplying power to save power. The power supply 460 may resume supply of power when the predetermined key provided to the remote control device 400 is manipulated.

The storage unit 470 may store various kinds of programs and application data necessary for control or operation of the remote control device 400. When the remote control device 400 wirelessly transmits and receives signals to and from the image providing device 50 via the RF module 421, the remote control device 400 and the image providing device 50 may transmit and receive signals in a predetermined frequency band. The processor 480 of the remote control device 400 may store, in the storage unit 470, information about, for example, a frequency band enabling wireless transmission and reception of signals to and from the image providing device 50, which is paired with the remote control device 400, and reference the same.

The processor 480 controls overall operations related to control of the remote control device 400. The processor 480 may transmit, via the wireless communication unit 425, a signal corresponding to manipulation of a predetermined key of the user input unit 435 or a signal corresponding to movement of the remote control device 400 sensed by the sensor unit 440 to the image providing device 50.

The user input interface unit 150 of the image providing device 50 may include a wireless communication unit 411 capable of wirelessly transmitting and receiving signals to and from the remote control device and a coordinate calculator 415 capable of calculating coordinates of the pointer corresponding to operation of the remote control device 400.

The user input interface unit 150 may wirelessly transmit and receive signals to and from the remote control device 400 via an RF module 412. In addition, the user input interface unit 150 may receive, via an IR module 413, a signal transmitted from the remote control device 400 according to an IR communication standard.

The coordinate calculator 415 may calculate coordinates (x, y) of the pointer 205 to be displayed on the display 180, by correcting the unstable position of a hand or an error in a signal corresponding to operation of the remote control device 400 which is received via the wireless communication unit 411.

The transmitted signal of the remote control device 400 input to the image providing device 50 via the user input interface unit 150 is transmitted to the processor 180 of the image providing device 50. The processor 180 may determine information about an operation of the remote control device 400 or manipulation of a key from the signal transmitted from the remote control device 400, and control the image providing device 50 according to the information.

As another example, the remote control device 400 may calculate coordinates of the pointer corresponding to movement thereof and output the same to the user input interface unit 150 of the image providing device 50. In this case, the user input interface unit 150 of the image providing device 50 may transmit, to the processor 180, information about the received coordinates of the pointer without separately correcting the unstable position of the hand or error.

As another example, in contrast with the example of the figure, the coordinate calculator 415 may be provided in the first processor 170 rather than in the user input interface unit 150.

Figure 6:
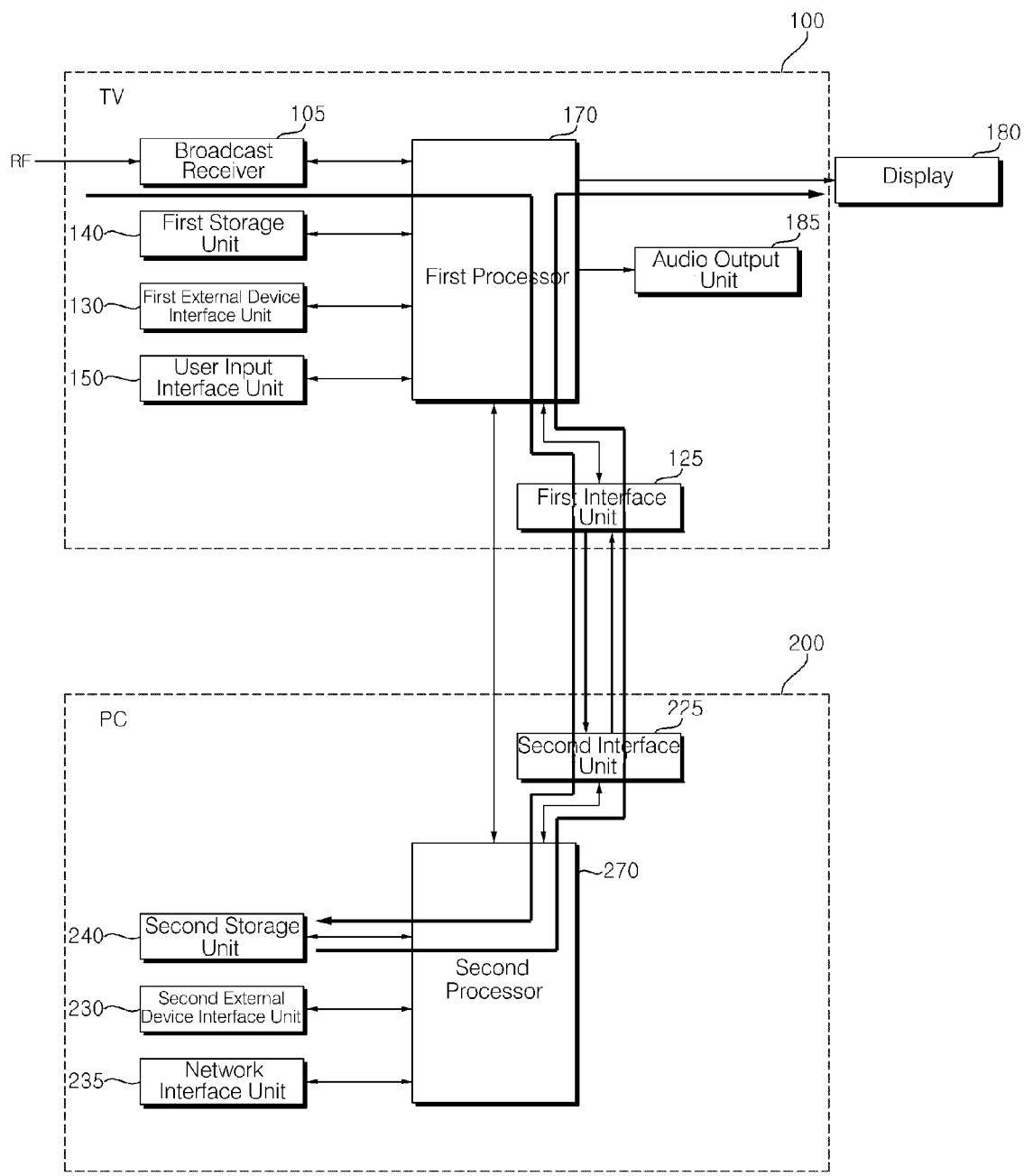
FIG. 6 illustrates storing and reproducing a broadcast signal in an image providing device according to an embodiment of the present invention.

FIG. 6 illustrates storing and reproducing a broadcast signal in an image providing device according to an embodiment of the present invention, and FIG. 7A to 16 illustrate operation of FIG. 6.

Referring to FIG. 6, the first circuit board 100 may receive a broadcast signal through the broadcast receiver 105. The received broadcast signal may be a terrestrial broadcast signal, a cable broadcast signal, or a broadcast signal received over a network.

When an input for receiving broadcast is provided, the first processor 170 may perform signal processing on the received broadcast signal.

For example, the first processor 170 may extract, from the received broadcast signal, at least one of channel information, broadcast program name information, broadcast start time information, and broadcast end information, add the extracted information to a broadcast signal, and output the broadcast signal to the first interface unit 125.

As another example, the first processor 170 may extract a decoded broadcast image from the input broadcast signal by performing image signal processing, and output the extracted broadcast image to the first interface unit 125.

According to the input for saving broadcast, the first interface unit 125 may transmit the input broadcast signal or broadcast image to the second interface unit 225 in the second circuit board 200.

According to the input for saving the broadcast, the second processor 270 may control a broadcast signal or broadcast image input from the second interface unit 225 to be stored in the second storage unit 240.

In storing the signal or image in the second storage unit 240, the second processor 270 may extract added information from the input broadcast signal and control the extracted information and the broadcast signal to be stored in the second storage unit 240. Alternatively, the second processor 270 may encode the input broadcast signal image and control the encoded broadcast image to be stored in the second storage unit 240.

According to the input for saving broadcast, the received broadcast content may be stably stored in the second storage unit 240 in the second circuit board 200, which has a large storage space.

In particular, when the user is in the outdoor environment, the first circuit board 100 and second circuit board 200 in the image providing device 50 may be activated at the broadcast time according to reservation of broadcast saving, and stably store received broadcast content in the second storage unit 240 in the second circuit board 200, which has a large storage space, according to the input for saving the broadcast.

Alternatively, when the user watches a screen of other content through the image providing device 50, received broadcast content may be stably stored in the second storage unit 240 in the second circuit board 200 which has a large storage space according to an input for saving broadcast. In particular, the first processor 170 and second processor 270 may be separated from each other such that signal processing on content which is being watched is performed by the first processor 170, and signal processing on broadcast content to be stored is performed by the second processor 270 or not separately performed. Thereby, signal delay does not occur in performing signal processing.

If the other content screen is a broadcast screen of another channel that is being watched, signal processing of the broadcast signal of another channel is performed by the first processor 170, signal processing of broadcast content to be stored is not performed or is performed by the second processor 270. Thereby, time delay does not occur in performing signal processing.

If an input for playing the stored broadcast content is provided, the first circuit board 100 and second circuit board 200 are activated according to the input for playing the broadcast content.

In addition, the second processor 270 may receive a broadcast signal or broadcast image stored in the second storage unit 240, and provide the same to the second interface unit 225.

At this time, separate signal processing may be performed. For example, the second processor 270 may decode the encoded broadcast signal or broadcast image. Alternatively, the second processor 270 may extract at least one of channel information, broadcast program name information, broadcast start time information, and broadcast end information from the broadcast signal, add the extracted information to a broadcast signal, and output the broadcast signal to the second interface unit 225.

According to the input for playing broadcast content, the second interface unit 225 may transmit the input broadcast signal or broadcast image to the first interface unit 125 in the first circuit board 100.

According to the input for playing the broadcast content, the first processor 170 may perform signal processing on the broadcast signal or broadcast image input from the first interface unit 125, and output a broadcast image or broadcast sound which can be reproduced.

The output broadcast image is displayed through the display 180, and the broadcast sound is output through the audio output unit 185.

As described above, the broadcast content stored in the second storage unit 240 in the second circuit board 200, which has a large storage space, may be stably reproduced according to the input for playing the broadcast content.

The first processor 170 may run a first OS, using the first OS-related data stored in the first storage unit 140. In addition, the first processor 170 may execute various applications which are based on the first OS.

For example, the first OS-based applications may include at least one of an application related to external input, a broadcast guide application, an application related to stored broadcast content, a Bluetooth application, a reservation application, a digital video recorder (DVR) application, a hotkey application, an application of Internet phone call service according to connection to a network, a VOD service application, a web album service application, a social networking service (SNS) application, a location-based service (LBS) application, a map application, a web search application, a game application, a schedule management application, and the like.

The first OS may be a UNIX-based OS, a Web-based OS, or the like.

The second processor 270 may run a second OS using data related to the second OS stored in the second storage unit 240. In addition, the second processor 270 may execute various applications which are based on the second OS.

Herein, the second OS may be different from the first OS and may be Windows, macOS, UNIX, or the like.

For example, the second OS-based applications may include at least one of a news-related application, an SNS-related application, a mail-related application, a document preparation-related application, an image playback-related application, audio playback-related application, a web browser application, a gaming application, a map application, a schedule management application, and the like.

Figure 7A:
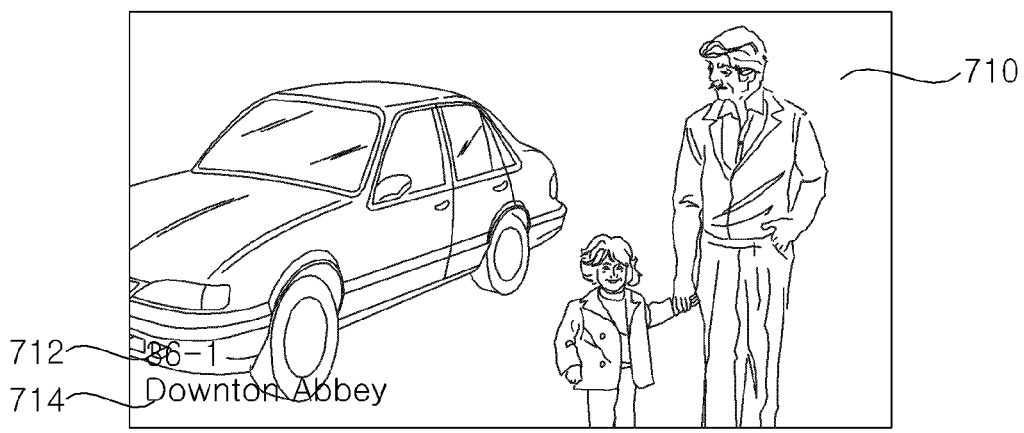
FIG. 7A to 16 illustrate operation of FIG. 6.
Figure 8A:
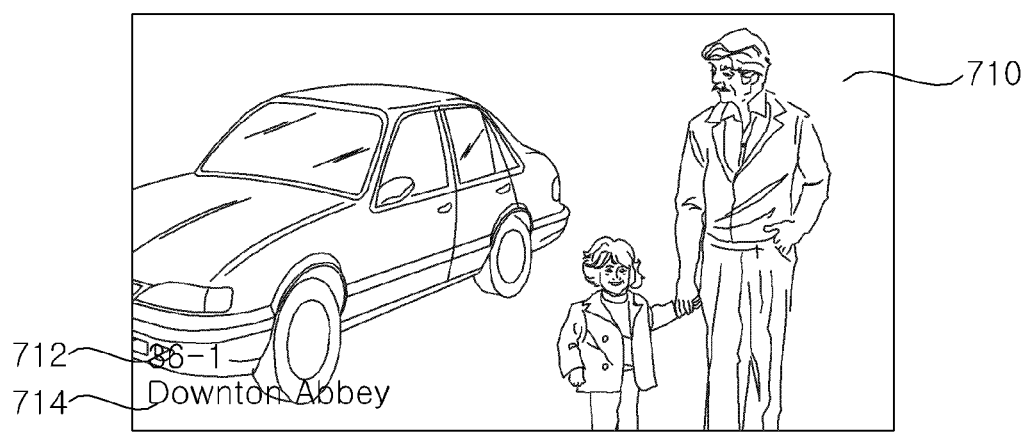

FIGS. 7A and 8A illustrate an exemplary broadcast image 710 signal-processed and output by the first processor 170.

The first processor 170 may receive a broadcast signal, perform signal processing on the received broadcast signal, extract a broadcast image and various kinds of information, and provide the display 180 with the broadcast image 710 including channel information (36-1) 712 and broadcast program name information (Downton Abbey) 714.

Figure 7B:
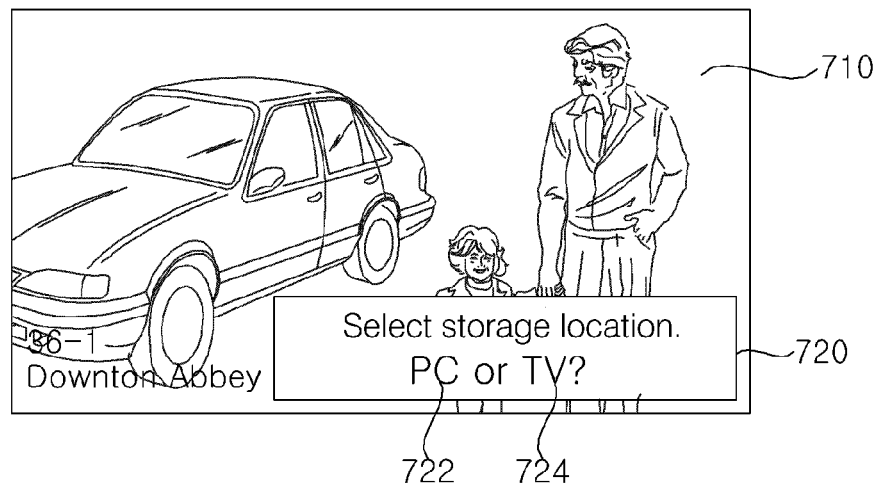

When an input for saving a broadcast is provided according to a user input, an object for selecting a storage location may be further provided as shown in FIG. 7B.

When an input for saving broadcast is provided, the first processor 170 may generate and provide, via the user input interface unit 150, an object 720 indicating whether to store the broadcast signal or broadcast image in the PC or TV. Herein, the PC item 722 may represent the storage unit 240 in the second circuit board 200, and the TV item 724 may represent the storage unit 140 in the first circuit board 100.

Figure 8B:
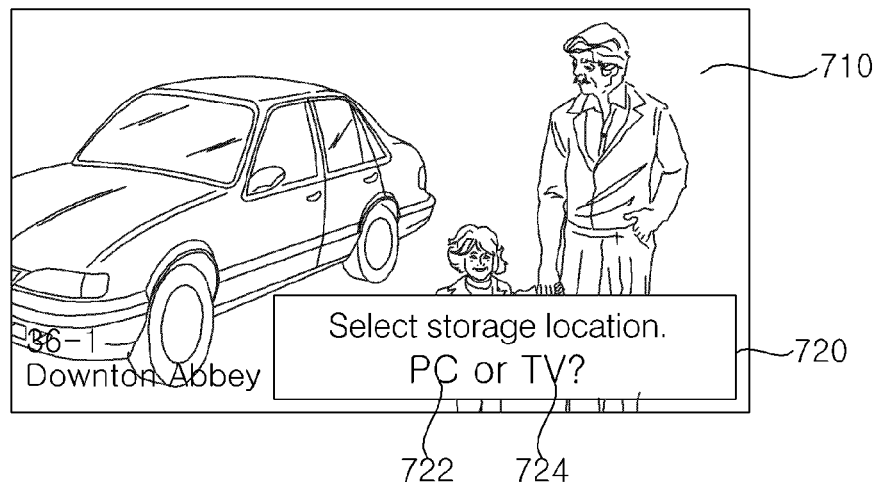

FIGS. 7B and 8B illustrate a case where an object 720 indicating whether to store a broadcast signal or broadcast image in addition to the channel information (36-1) 712 and broadcast program name information (Downton Abbey) 714 is provided in the broadcast image 710.

When the PC item 722 is selected, as shown in FIG. 6, the broadcast signal or broadcast image may sequentially pass through the broadcast receiver 105, the first processor 170, the first interface unit 125, the second interface unit 225 and the second processor 270, and then be stored in the second storage unit 240.

Figure 7C:
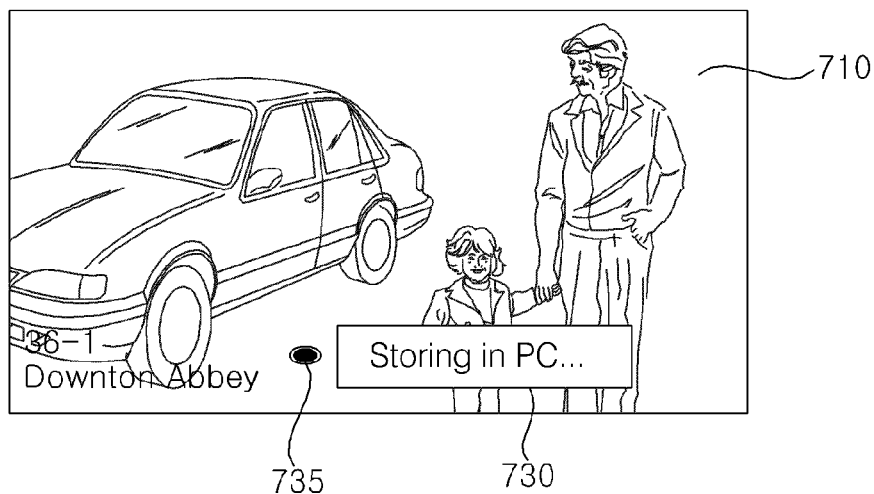

FIG. 7C illustrates an object 730 indicating that a broadcast signal or broadcast image is being stored in the second circuit board and an object 735 indicating that the broadcast is being stored.

In saving broadcast, the first processor 170 may generate the object 735 indicating the storage location information for the broadcast signal and the object 735 indicating that the broadcast signal is being stored.

FIG. 7C illustrates providing, on the broadcast image 710, the object 730 indicating the storage location information for the broadcast signal and the object 735 indicating that the broadcast signal is being stored are provided in addition to the channel information (36-1) 712 and broadcast program name information (Downton Abbey) 714. Thereby, the user may easily recognize whether the broadcast signal is being stored and the storage location.

If the TV item 724 is selected, a broadcast signal or broadcast image may be stored in the first storage unit 140, sequentially passing through the broadcast receiver 105 and the first processor 170.

Figure 8C:
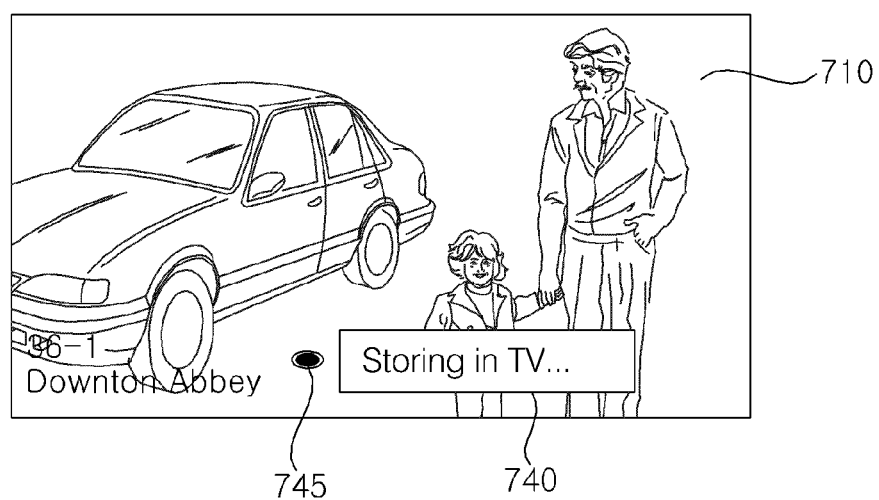

FIG. 8C illustrates an object 740 indicating that a broadcast signal or broadcast image is being stored in the first circuit board and an object 745 indicating that the broadcast signal is being stored.

In storing a broadcast, the first processor 170 may generate the object 740 indicating the storage location information for the broadcast signal and the object 745 indicating that the broadcast is being stored.

FIG. 8C illustrates providing, on the broadcast image 710, the object 740 indicating the storage location information for the broadcast signal and the object 745 indicating that the broadcast signal is being stored are provided in addition to the channel information (36-1) 712 and broadcast program name information (Downton Abbey) 714. Thereby, the user may easily recognize whether the broadcast signal is being stored and the storage location.

At least one of the first processor 170 and the second processor 270 may control the broadcast signal or broadcast image to be stored in the first storage unit 140 in the first circuit board 100. If there is a shortage of storage space, at least one of the first processor 170 and the second processor 270 may control the broadcast signal or broadcast image to be stored in the second storage unit 240 in the second circuit board 200.

Figure 8D:
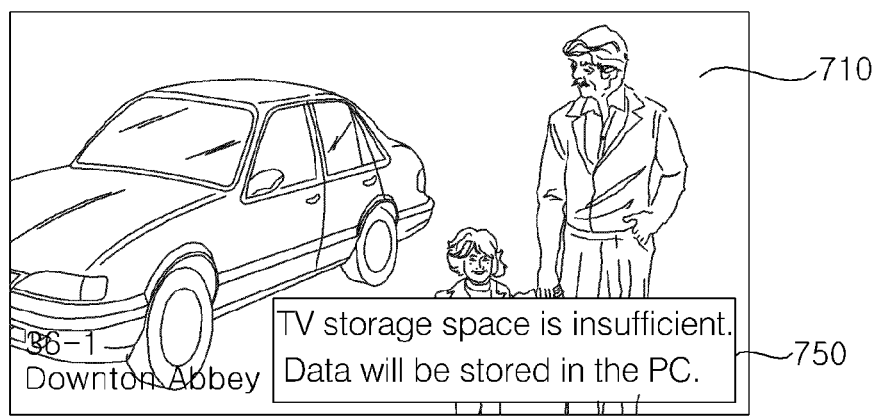

FIG. 8D illustrates a case where an object 750 indicating that a broadcast signal or broadcast image will be stored in the second circuit board as there is a shortage of the storage space of the first circuit board.

If there is a shortage of the storage space of the first circuit board, the first processor 170 may generate the object 750 indicating that the broadcast signal or broadcast image will be stored in the second circuit board.

Figure 8E:
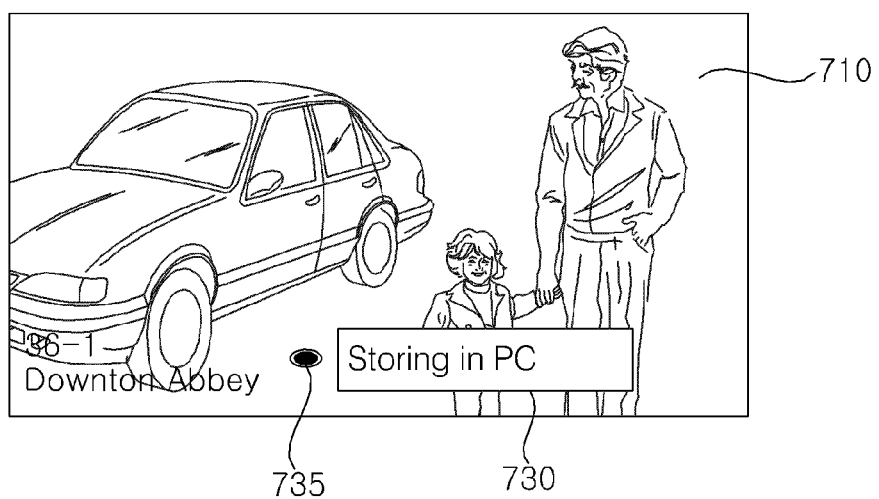

Next, FIG. 8E illustrates an object 730 indicating that a broadcast signal or broadcast image is being stored in the second circuit board and an object 735 indicating that the broadcast is being stored.

In saving broadcast, the first processor 170 may generate the object 735 indicating the storage location information for the broadcast signal and the object 735 indicating that the broadcast signal is being stored. Thereby, the user may easily recognize whether the broadcast signal is being stored and the storage location.

In contrast with the example of FIGS. 8C to 8E, if there is a shortage of the storage space in the first circuit board, the first processor 170 may generate a message indicating that storing in the first circuit board is impossible, and control the broadcast signal or broadcast image to be stored in the second storage unit 240 in the second circuit board 200.

If an input for displaying the home screen is provided, at least one of the first processor 170 and the second processor 270 may provide a home screen including a broadcast image corresponding to the broadcast signal and a background image which is executed by the second processor 270.

In this case, at least one of the first processor 170 and the second processor 270 may further provide an application image corresponding to at least one application executed by the first processor 170 and an application image corresponding to at least one application executed by the second processor 270.

Figure 9A:
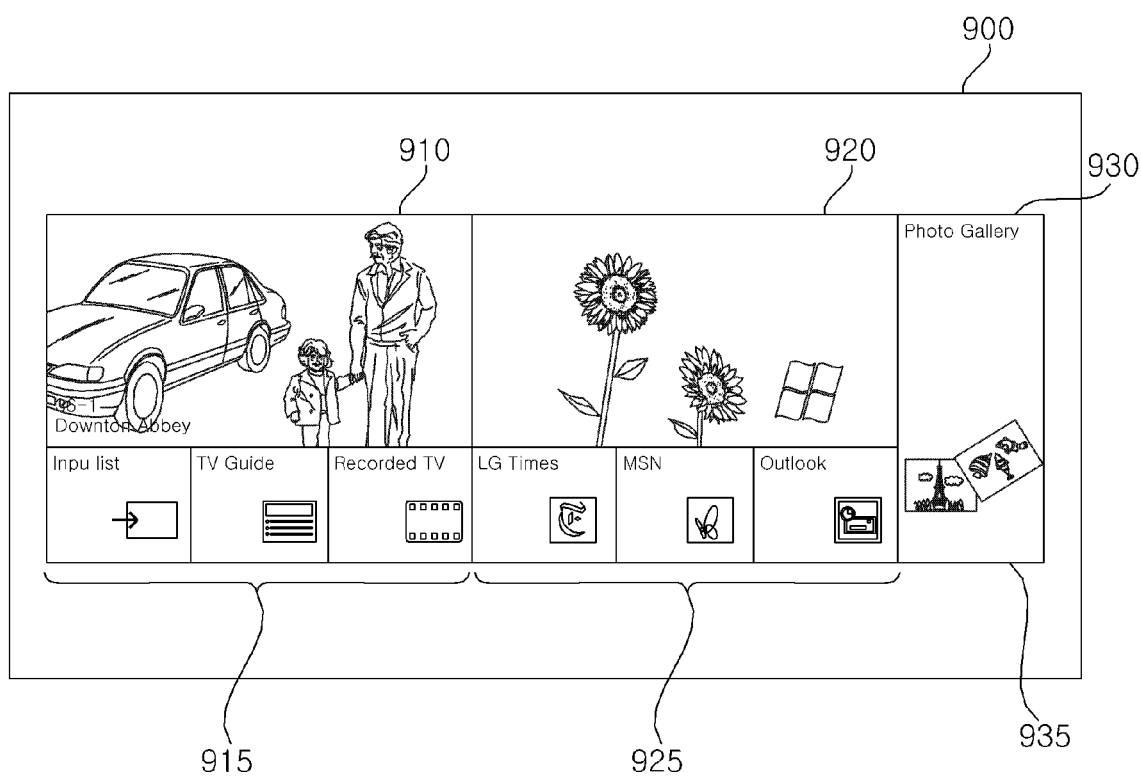

FIG. 9A illustrates a home screen 900 including a broadcast image 910 signal-processed in the first circuit board and a background image 920 executed by the second processor 270.

When the input for displaying the home screen is provided by the user, the first processor 170 may generate the home screen 900 and output the same to the display 180, as shown in FIG. 9A.

To this end, the first processor 170 may receive the background image 920 executed by the second processor 270, via the first interface unit 125.

The home screen 900 may further include, near the broadcast image 910, an application image 915 including an external input list item, a broadcast guide item, and a stored broadcast content item. The application image 915 is related to the first circuit board 100. In particular, the application image 915 may be an image corresponding to an application executed by the first processor 170.

The home screen 900 may further include, near the background image 920, an application image 925 including a news item, a social network service item, and a mailing service item. The application image 925 is related to the second circuit board 200. In particular, the application image 925 may be an image corresponding to an application executed by the second processor 270.

The home screen 900 may further include a photo gallery image 930, which is related to images stored in the first storage unit 140 or the second storage unit 240.

The user may check, through the home screen 900, the broadcast content and applications executed in the two boards and easily implement a desired item through manipulation.

If an input for displaying the home screen is provided while a broadcast image is provided by activating the first circuit board 100, the second circuit board 200 in the deactivated state may be activated, namely booted. In this case, the broadcast image may be provided on the home screen 900. Thereafter, the background image of the activated second circuit board 200 may be signal-processed by the first processor 170, and then provided.

If an input for displaying the home screen is provided while a background image and relevant folders are provided by activating the second circuit board 200, the first circuit board 100 in the deactivated state may be activated, namely booted. In this case, the background image of the second circuit board 200 may be provided on the home screen 900. Thereafter, a broadcast image signal-processed by the activated first processor 170 may be provided.

Figure 9B:
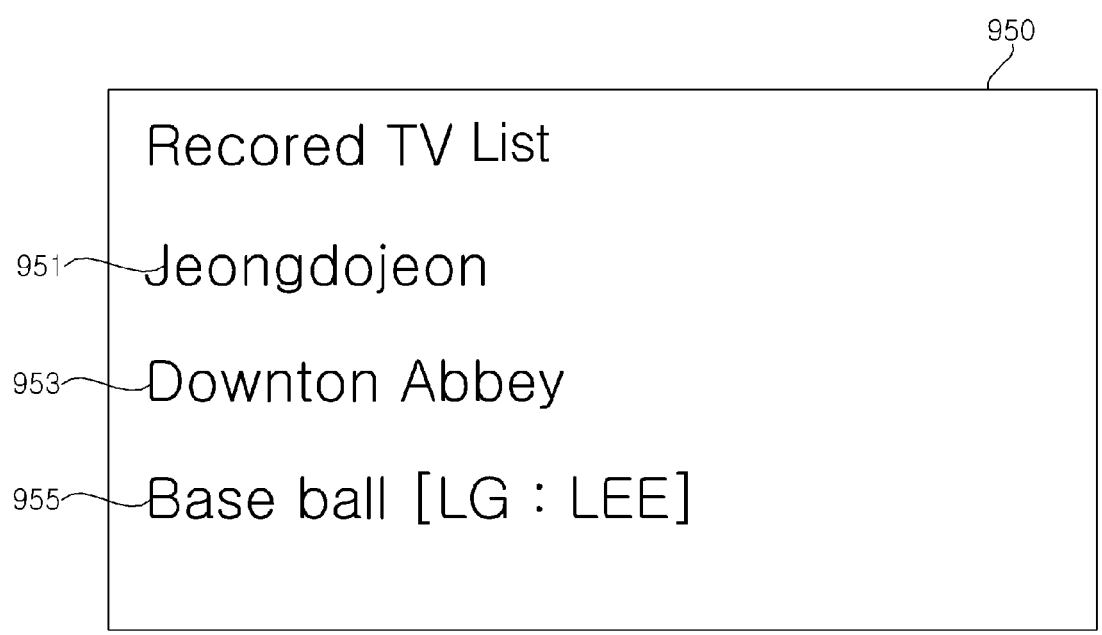

FIG. 9B illustrates a stored broadcast content list screen 950 according to selection of a stored broadcast content item from the application image 915 on the home screen 900.

When an application related to a broadcast image stored in the second storage unit 240 is executed on the home screen 900, at least one of the first processor 170 and the second processor 270 may provide the broadcast content list screen 950 including a stored broadcast image list. That is, at least one of the first processor 170 and the second processor 270 may enter the TV mode.

In the figure, first to third items 951, 953, 955 are exemplarily provided on the broadcast content list screen 950.

Figure 9C:
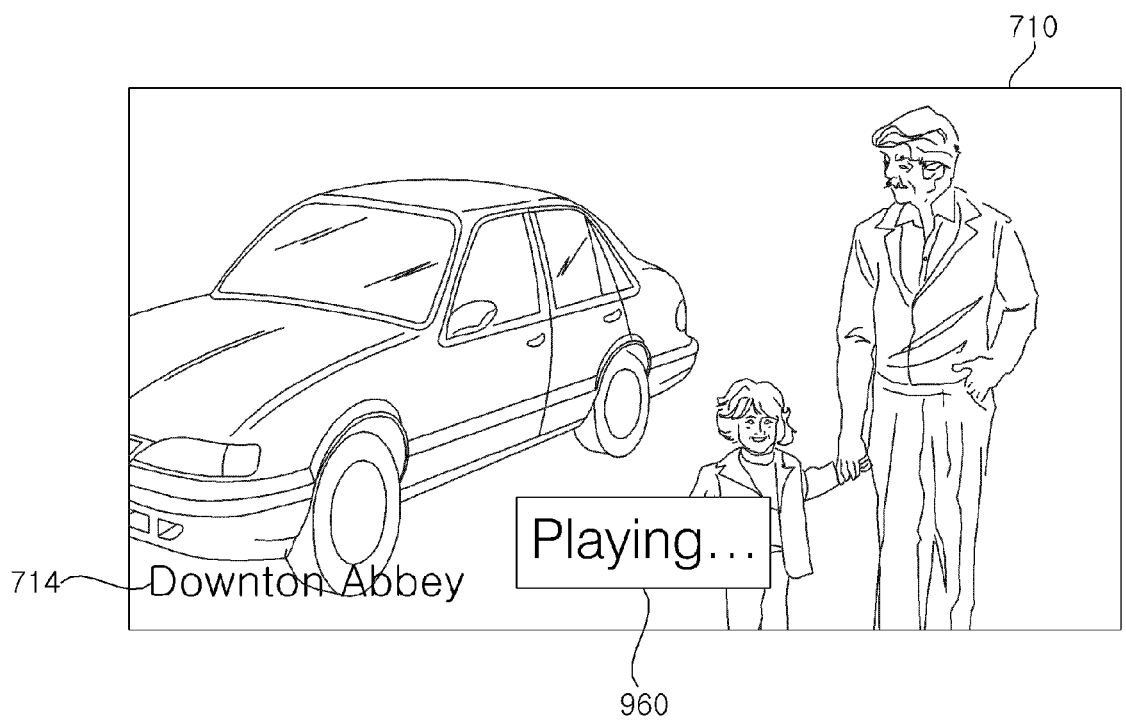

If the second broadcast item 953 is selected, a reproduced broadcast image 710 may be provided, as shown in FIG. 9C.

In this case, the first processor 170 may generate an object 960 indicating that the image is being played. In the figure, the broadcast image 710 including the object 960 is exemplarily shown. Additionally, broadcast program name information 714 without channel information may be further provided.

Playing the broadcast content may be implemented when a broadcast signal or broadcast image stored in the second storage unit 240 sequentially passes through the second processor 270, the second interface unit 225, the first interface unit 125, and the first processor 170, as shown in FIG. 6.

Similar to the example of the FIGS. 9A and 9B, FIGS. 10A and 10B shows a stored broadcast content list screen 950 provided according to selection of a stored broadcast content item from the application image 915 on the home screen 900.

However, in this example, a pointer 205 corresponding to a pointing signal of the remote control device 400 is used in selecting the broadcast content item. That is, if the user positions the pointer 205 on the broadcast content item by moving the remote control device 400 and clicks the Confirm key or OK key, the stored broadcast content list screen 950 may be provided, as shown in FIG. 10B. Thereby, the user may easily enter the stored broadcast content list screen 950.

Figure 11A:
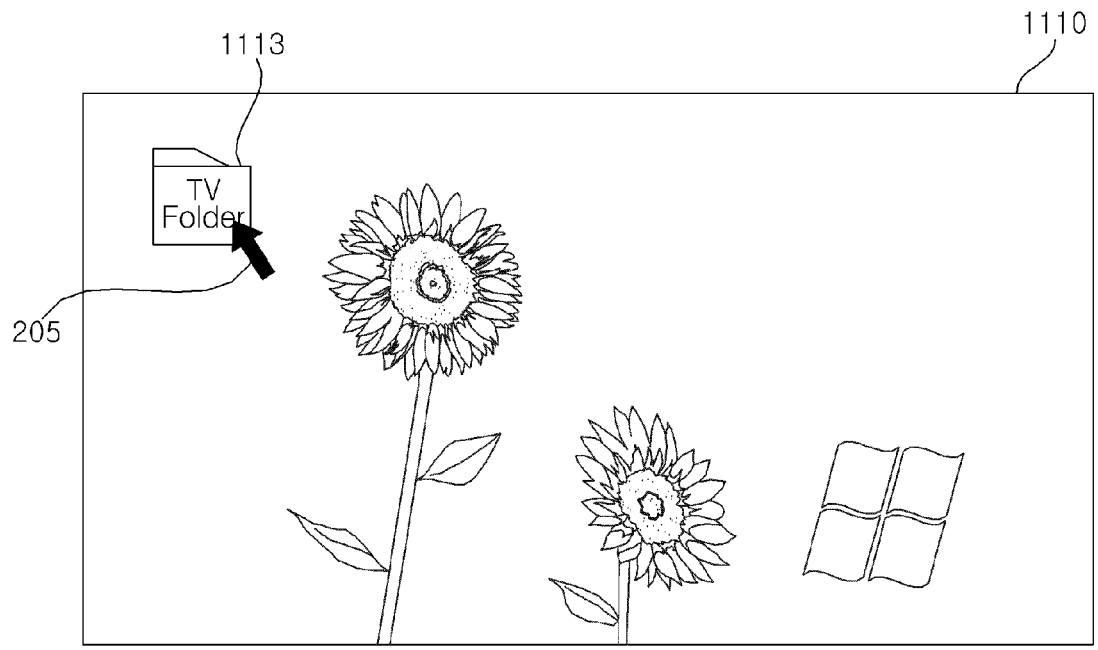
Figure 11B:
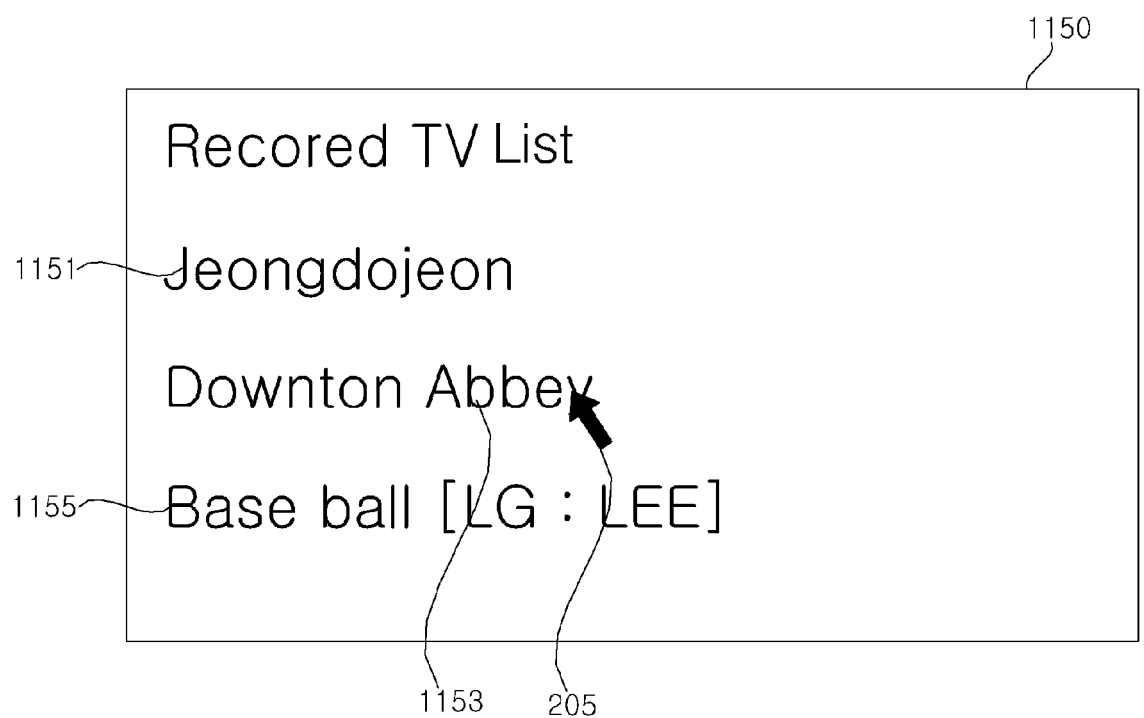
Figure 11C:
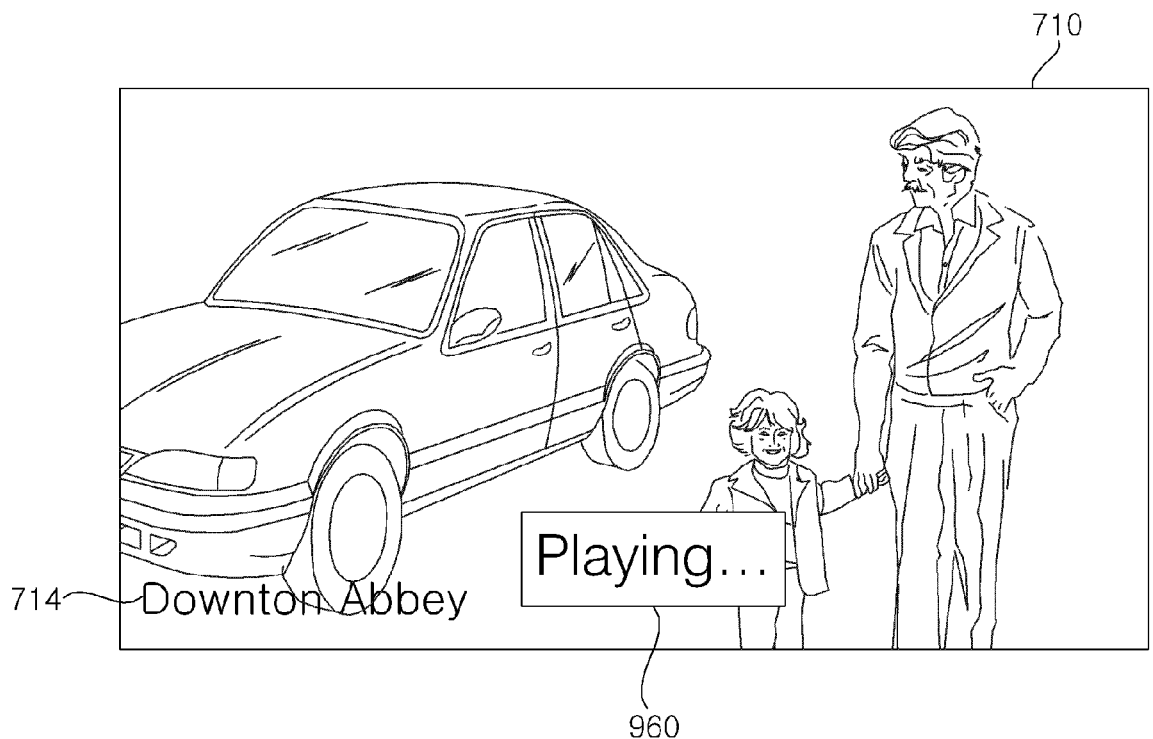

Next, FIGS. 11A to 11C illustrate playing a selected broadcast image based on selection of a broadcast image storing folder 1113 in the background image 1110.

Figure 10A:
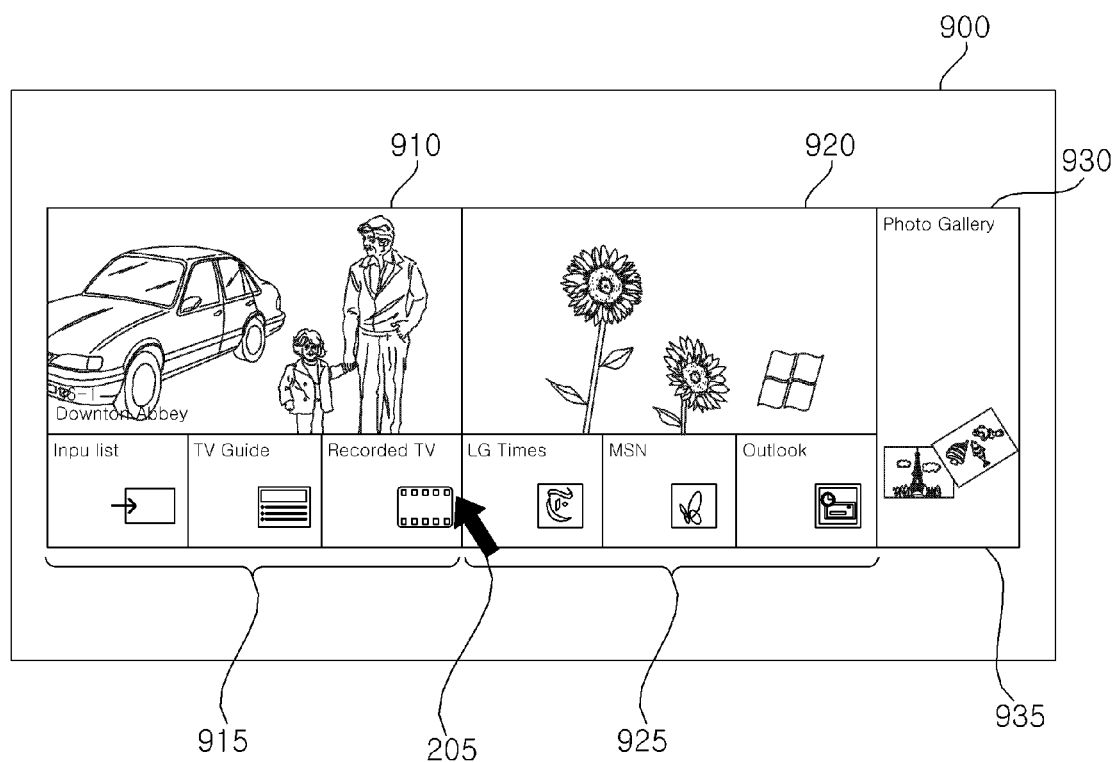
Figure 10B:
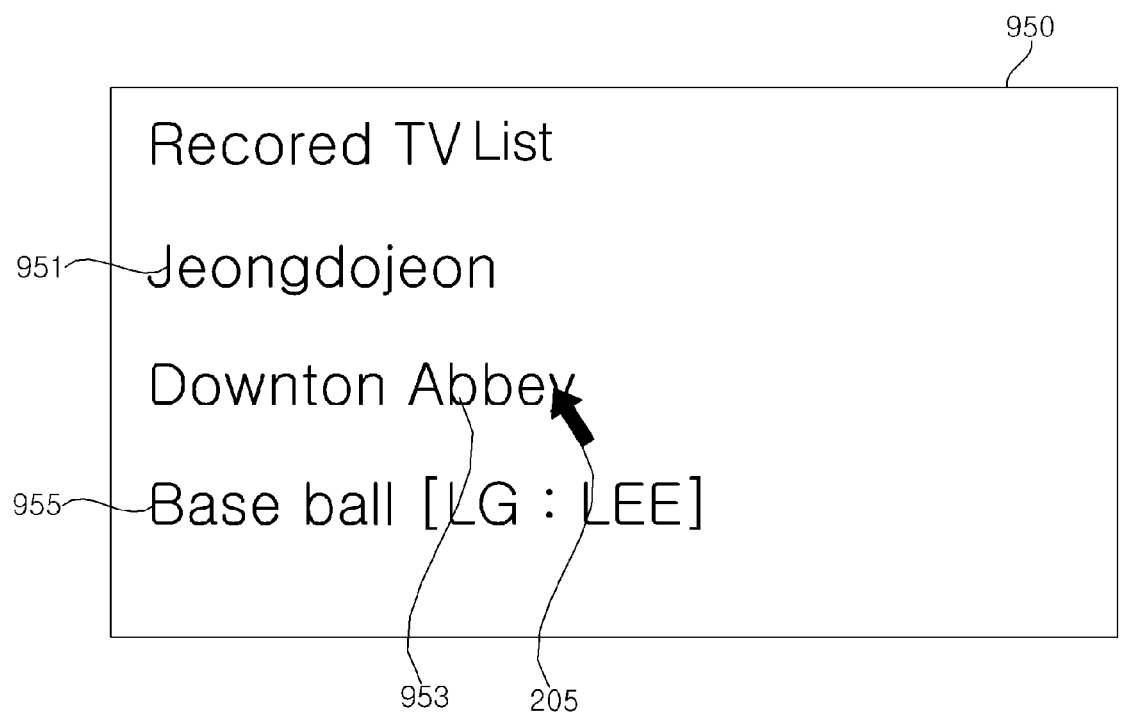

If the background image 920 is selected on the home screen 900 of FIG. 10A, at least one of the first processor 170 and the second processor 270 provides the background image 1110, which is larger than the background image on the screen, as shown in FIG. 11A. That is, at least one of the first processor 170 and the second processor 270 may enter the PC mode.

The background image 1110 may include various folders, in particular, a broadcast image storing folder 1113.

If the user selects the broadcast image storing folder 1113 using the pointer 205, at least one of the first processor 170 and the second processor 270 may provide a broadcast content screen 1150 including the broadcast image list stored in the second storage unit 240.

FIG. 11B illustrates providing first to third broadcast items 1151, 1153, 1155 on the broadcast content screen 1150.

If the second broadcast item 1153 is selected by the pointer 205, a reproduced broadcast image 710 may be provided, as shown in FIG. 11C.

In this case, the first processor 170 may generate an object 960 indicating that the image is being played. In the figure, the broadcast image 710 including the object 960 is exemplarily shown. Additionally, broadcast program name information 714 without channel information may be further provided.

Playing the broadcast content may be implemented when a broadcast signal or broadcast image stored in the second storage unit 240 sequentially passes through the second processor 270, the second interface unit 225, the first interface unit 125, and the first processor 170, as shown in FIG. 6.

The pointer 205 of the FIGS. 11A and 11B may be a pointer corresponding to the remote control device 400 or a pointer corresponding to a mouse.

Figure 12:
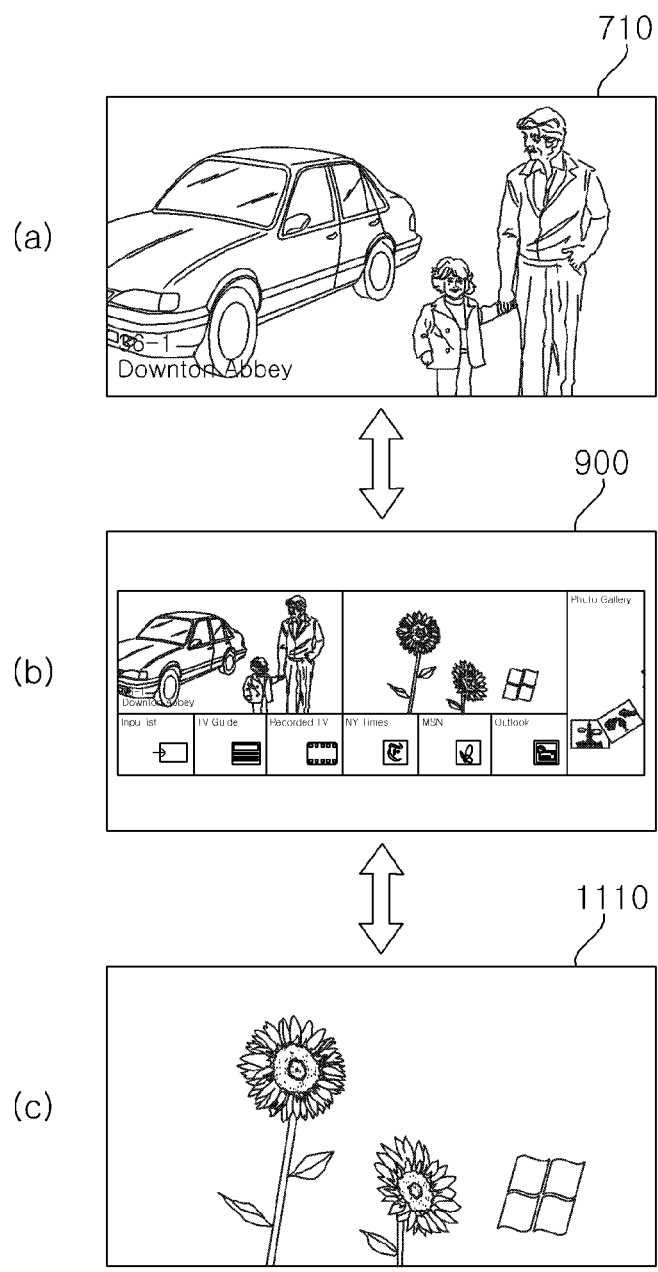

FIG. 12 illustrates a broadcast image screen 700, a home screen 900, and a background image 1110.

Referring to the figure, when a broadcast image 910 is selected on home screen 900, at least one of the first processor 170 and second processor 270 may switch the screen to provide a broadcast image larger than that of the broadcast image 910. When the background image 920 is selected on the home screen 900, at least one of the first processor 170 and the second processor 270 may provide a background image larger than the displayed background image.

For example, if the broadcast image 910 is selected on the home screen 900, the first processor 170 may enter the TV mode, which is a first mode. Thereby, the first processor 170 may control the broadcast image 710 to be displayed in full screen on the display 180.

As another example, if the background image 920 is selected on the home screen 900, the second processor 270 may enter the PC mode, which is a second mode. Thereby, the second processor 270 may control the background image 1110 to be displayed in full screen on the display 180. In this case, the first processor 170 may bypass the background image without separate signal processing.

Figure 13:
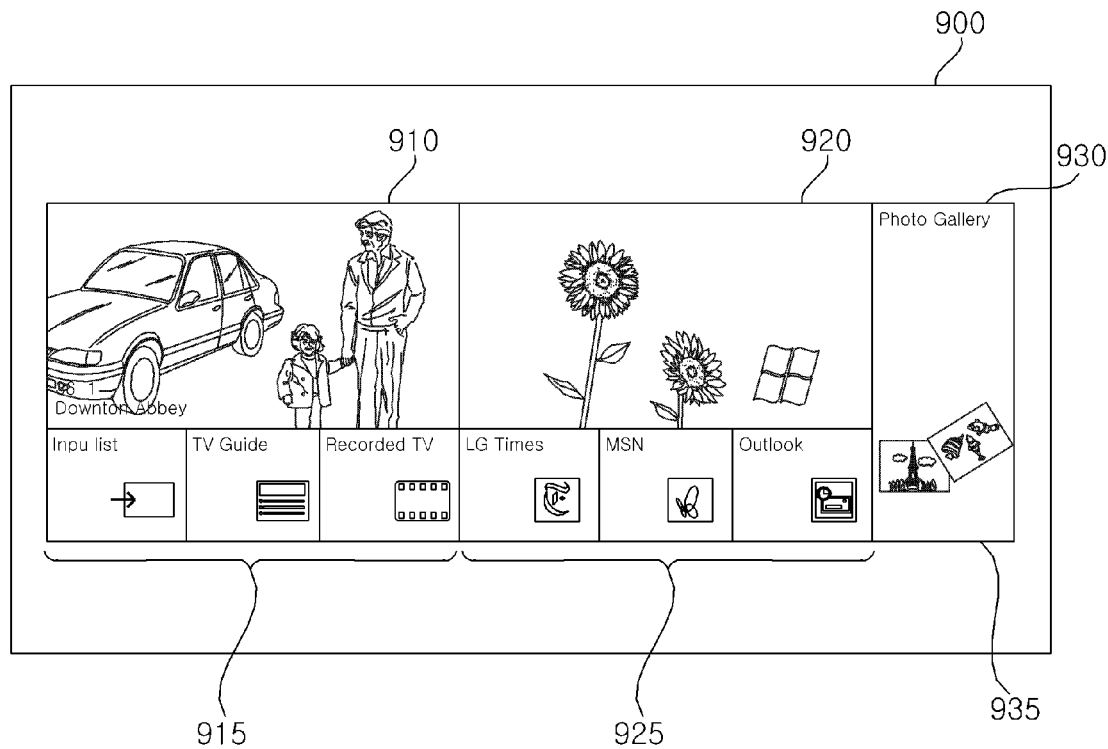

FIG. 13 illustrates a broadcast image 910 which is signal-processed by the first circuit board and a home screen 900 including a background image 920 executed by the second processor 270.

When an input for displaying the home screen is provided by the user, the first processor 170 may generate a home screen 900 and output the same to the display 180 as shown in FIG. 13.

To this end, the first processor 170 may receive, via the first interface unit 125, the background image 920 executed by the second processor 270.

The home screen 900 may further include, near the broadcast image 910, an application image 915 including an external input list item, a broadcast guide item, and a stored broadcast content item. The application image 915 is related to the first circuit board 100. In particular, the application image 915 may be an image corresponding to an application executed by the first processor 170.

If the broadcast image 910 is selected, the first processor 170 may enter the TV mode, and provide an enlarged broadcast image or provide an enlarged broadcast image and an application image.

The home screen 900 may further include, near the background image 920, an application image 925 including a news item, a social network service item, and a mail service item. The application image 925 is related to the second circuit board 200. In particular, the application image 925 may be an image corresponding to an application executed by the second processor 270.

If the background image 920 is selected, at least one of the first processor 170 and the second processor 270 may enter the PC mode, and provide an enlarged background image or provide an enlarged background image and an application image executed by the second processor 270.

The home screen 900 may further include a photo gallery image 930, which is related to images stored in the first storage unit 140 or the second storage unit 240.

The user may check, through the home screen 900, the broadcast content and applications executed in the two boards and easily implement a desired item through manipulation.

Figure 14:
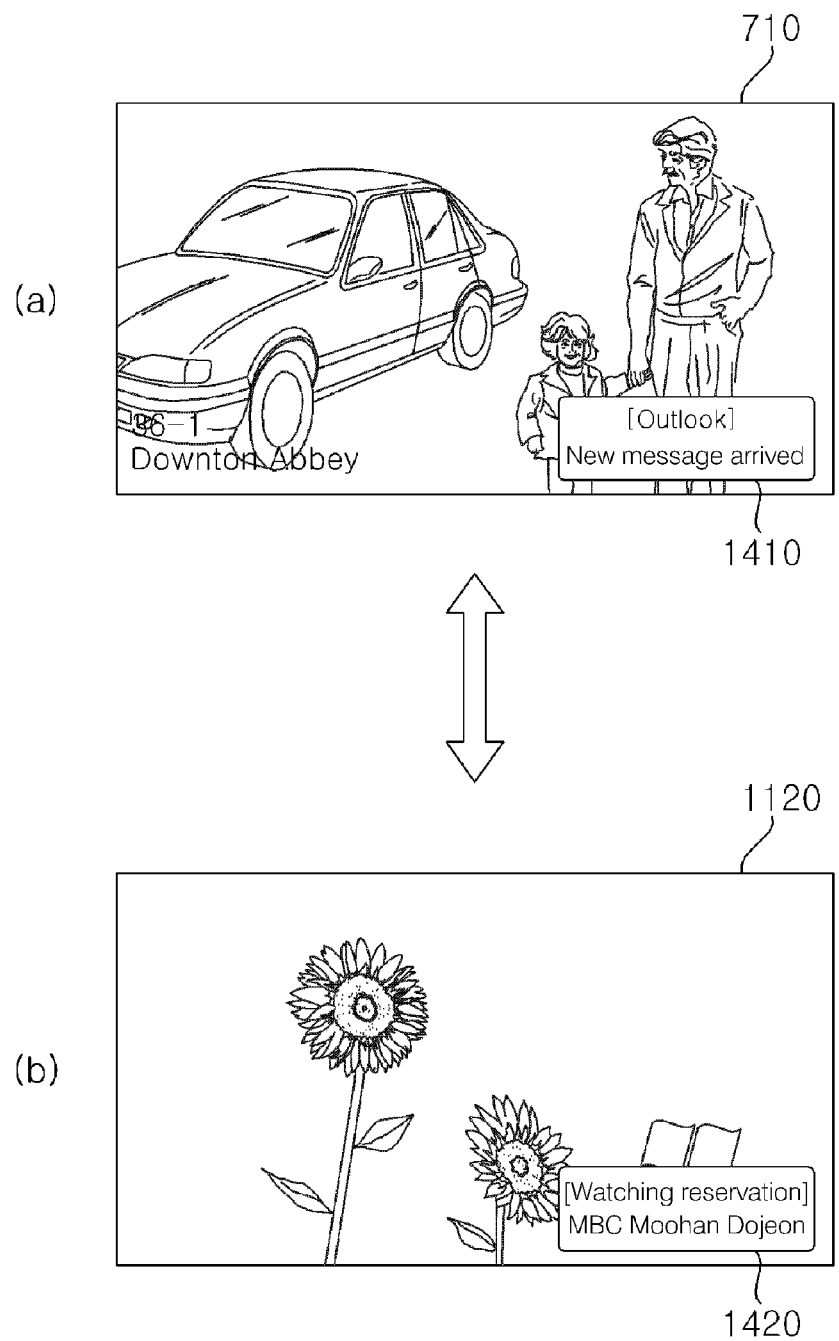
Figure 15A:
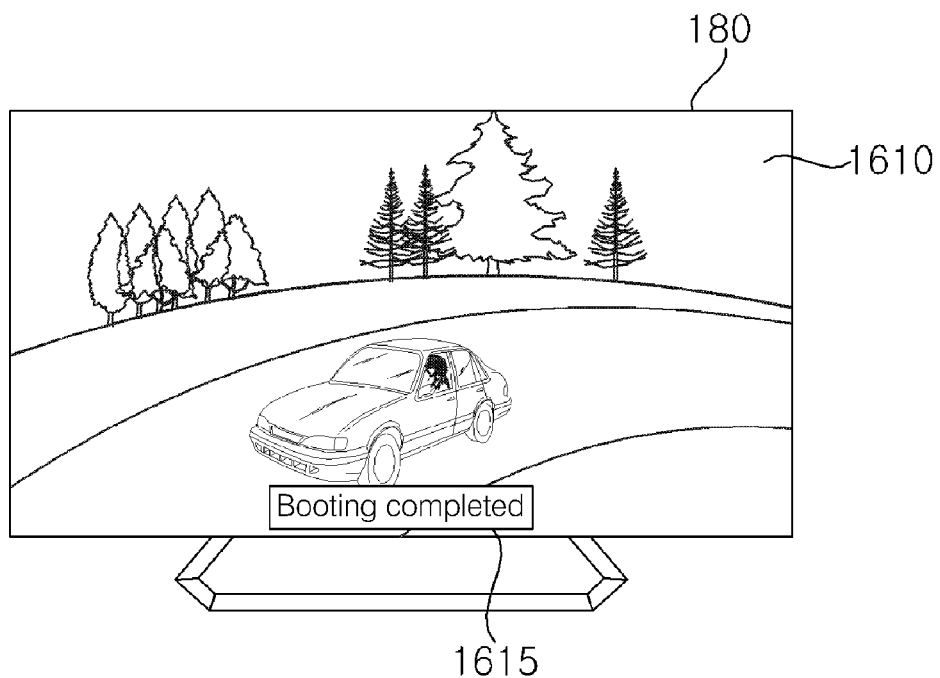
Figure 15B:
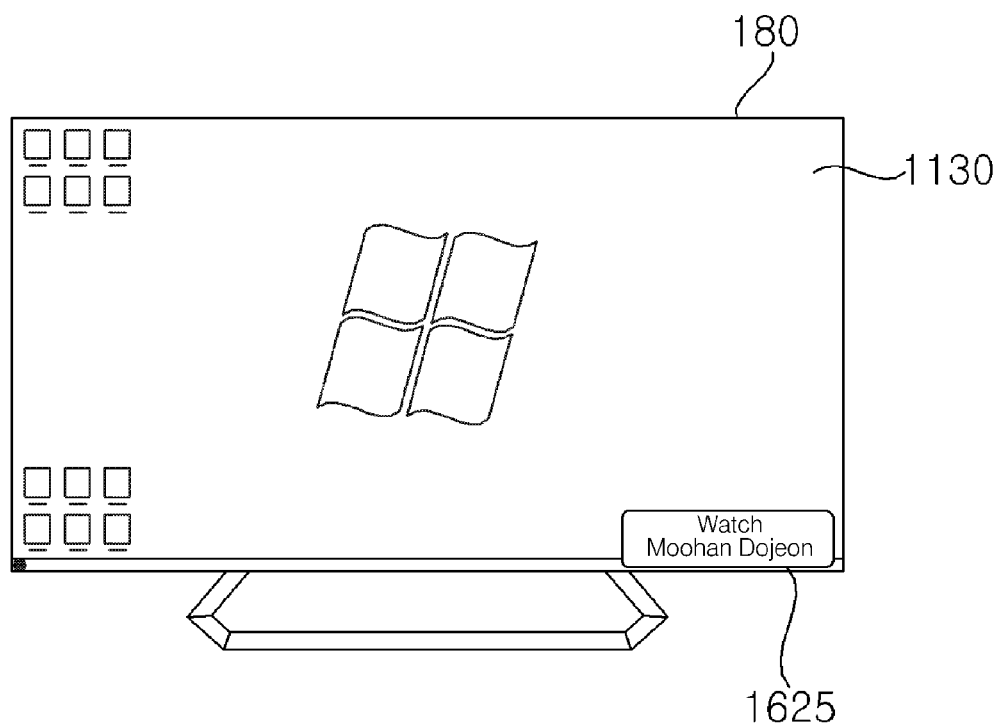
Figure 16:
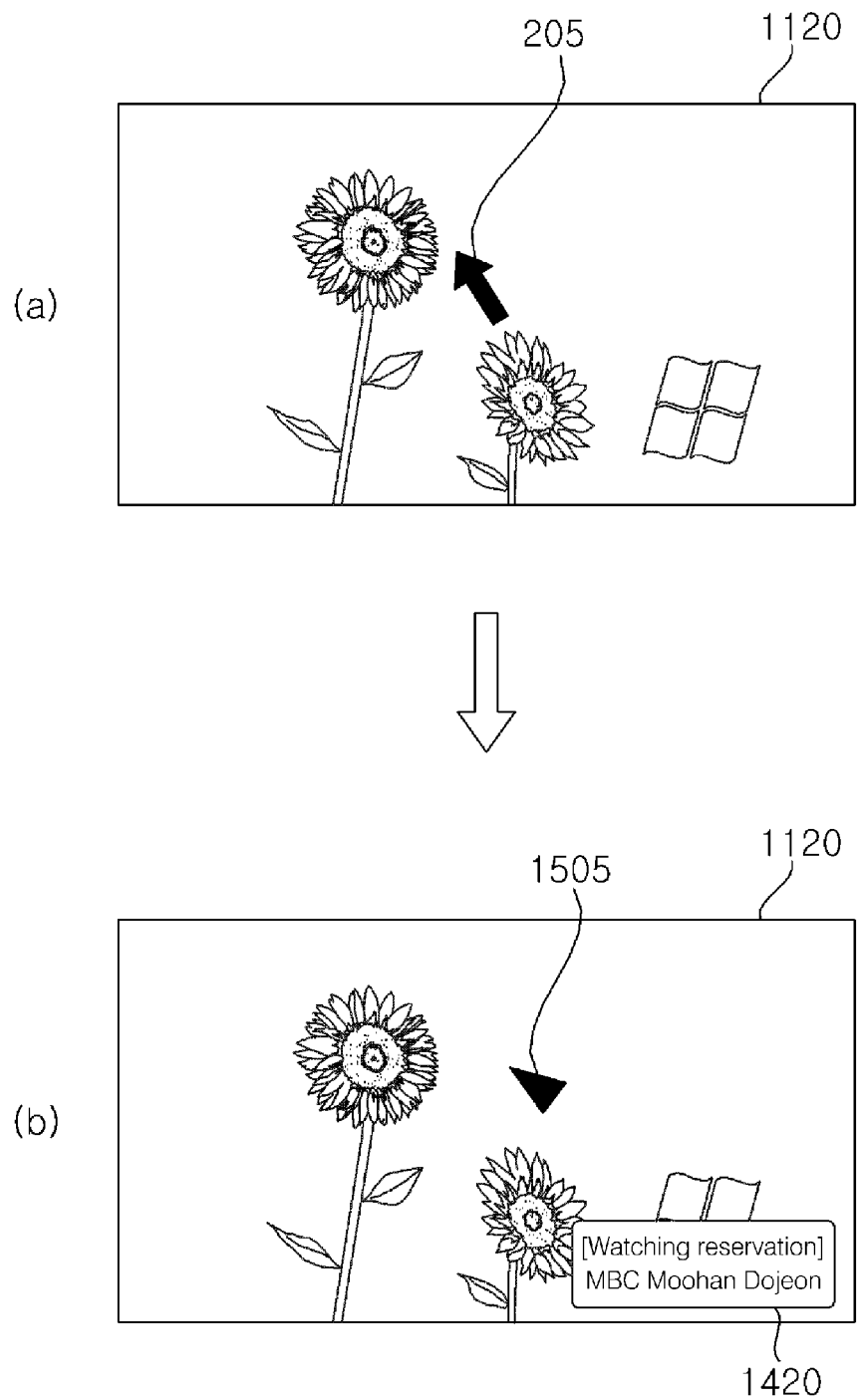

FIGS. 14, 15A and 15B illustrate displaying a message indicating a new event that occurs in the TV mode or PC mode.

FIG. 14(a) illustrates providing an object 1410 indicating a new event when the event occurs in the second circuit board 200 in the TV mode.

When a new event occurs in the second circuit board 200 while the broadcast image 710 is displayed on the display 180, the first processor 170 may provide the object 1410 indicating the event.

In the figure, an object indicating reception of an email is exemplary shown according to an email reception event.

Similarly, the first processor 170 may provide an object indicating reception of a message or login of another user in a social network service.

If predetermined content is downloaded from a specific server, the first processor 170 may provide an object indicating completion of downloading or program update after downloading.

Alternatively, the first processor 170 may provide an object indicating a pre-input schedule on a schedule management program such as a calendar.

Various kinds of event information described above may be generated by the second processor 270 and transmitted to the first processor 170 via the second interface unit 225 and first interface unit 125, and the first processor 170 may receive the event information and generate an object indicating the received event information.

Next, FIG. 14(b) illustrates providing an object 1420 indicating a new event when the event occurs in the first circuit board 100 in the PC mode.

When a new event occurs in the first circuit board 100 in the PC mode, in which a background image is displayed on the display 180, the second processor 270 may provide an object indicating the event.

In the figure, an object 1420 indicating reservation of broadcast watching according to an event of reserving broadcast watching is exemplary shown.

In addition to the event of reserving broadcast watching, various events such as saving broadcast and an event of announcing start of a broadcast program that the user has interest in may occur and a corresponding object may be generated.

FIG. 15A illustrates displaying an object 1615 indicating activation of the second circuit board 200, may be completion of activation, namely, booting of the second circuit board 200 while a broadcast image 1610 is displayed in the TV mode. Thereby, the user may directly recognize activation of the second circuit board 200.

The object 1615 may be generated by the first processor 170 based on the booting completed information.

FIG. 15B illustrates displaying an object 1625 announcing start of a broadcast program in which the user is interested while the background image 1130 is displayed in the PC mode. Thereby, the user may directly recognize a broadcast image in which a user is interested while using the second circuit board 200.

The object 1625 may be generated by the second processor 270 based on the start information about a broadcast program in which the user is interested.

According to an embodiment of the present invention, the image providing device 50 may display a pointer through various input devices. In particular, the image providing device 50 may display a pointer corresponding to the remote control device 400 in the PC mode and a pointer corresponding to a mouse in the TV mode.

FIG. 16(a) illustrates displaying a pointer 205 corresponding to the remote control device 400 in the background image 1120, and FIG. 16(b) illustrates displaying a pointer 1505 corresponding to a mouse (not shown) in the background image 1120.

The pointer 205 corresponding to the remote control device 400 may be generated by the first processor 170 based on a pointing signal received from the user input interface unit 150, and the second processor 270 may receive the generated pointer and overlay the background image 1120 with the same.

The pointer 1505 corresponding to the mouse (not shown) may be generated by the second processor 270 based on a pointing signal received through the external device interface unit 230 of the second circuit board 200. The second processor 270 may overlay the generated pointer image on the background image 1120.

Figure 17:
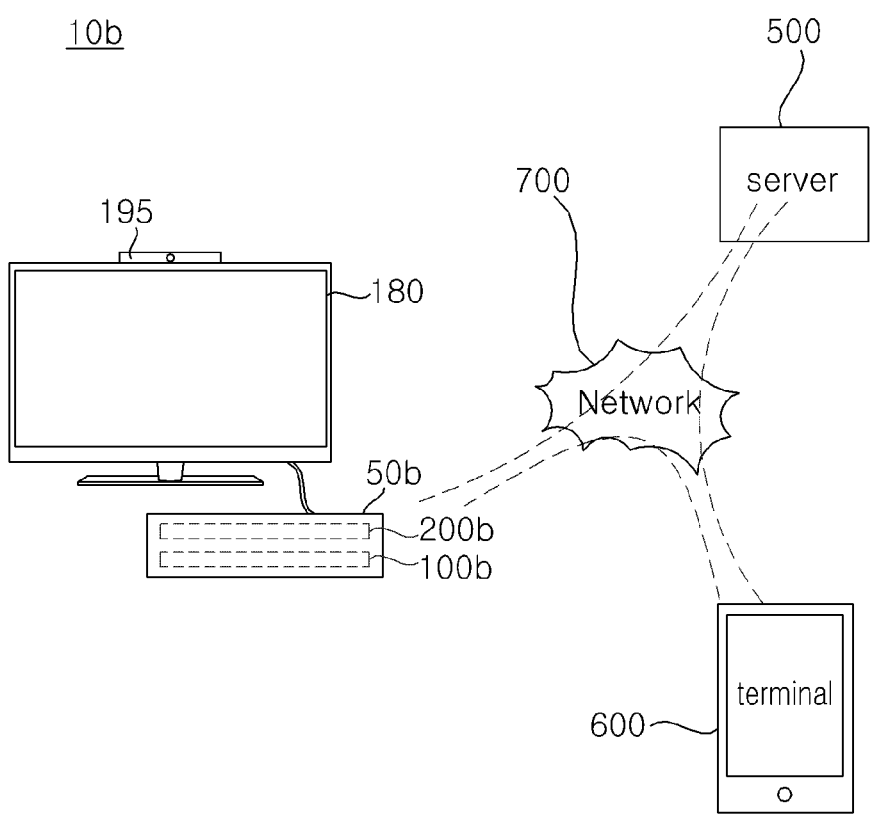
FIG. 17 illustrates an image providing system according to another embodiment of the present invention.

FIG. 17 illustrates an image providing system according to another embodiment of the present invention.

Referring to FIG. 17, an image providing system 10*b* according to an embodiment may include a terminal 600, a server 500, and an image providing device 50*b*.

The terminal 600 may connect to the server 500 according to an input web address, receive information for connection to a personal server from the server 500, and display a screen for connection to the personal server.

When login information is input on the personal server connection screen, the terminal 600 may transmit login information to the server 500, receive personal server list information corresponding to the login information from the server 500, and display a personal server list screen.

When a personal server is selected on the displayed personal server list screen, the terminal 600 makes a request to the server 500 for network information corresponding to the selected personal server.

The server 500 transmits the network information corresponding to the requested personal server to the terminal 600, and the terminal 600 receives the network information corresponding to the personal server from the server 500. Then, the terminal 600 may connect to the selected personal server using the received network information.

Herein, the personal server may correspond to the image providing device 50*b* shown in FIG. 17. That is, when one personal server is selected, the terminal 600 may connect to the corresponding image providing device 50.

The image providing device 50*b*, which is a device for providing images, may provide a predetermined image to an external device.

In particular, the image providing device 50*b* may receive a broadcast signal, and perform signal processing thereon. Thereby, the image providing device 50 may provide streaming of a broadcast content, or transmit content stored in the memory. That is, the image providing device 50 may operate as a personal server.

To implement transmission of content to the outside, the image providing device 50*b* may have network information. Herein, the network information may include public IP information and private IP information.

To connect to an external server 500 or the terminal 600, the image providing device 50*b* may connect to a network 700 via an AP device (not shown).

Herein, network information corresponding to the AP device (not shown) may include public IP information.

A device, particularly, the image providing device 50*b* that is connected to the AP device (not shown) in a wired or wireless manner constitutes an internal network in the AP device (not shown), and thus may be assigned a private IP by the AP device (not shown). Accordingly, the network information corresponding to the image providing device 50*b* in the AP device (not shown) may include private IP information.

That is, in order to connect to the external server 500 or the terminal 600, the image providing device 50*b* may have public IP information corresponding to the AP device (not shown) and private IP information corresponding to the image providing device 50*b*.

Thereby, when one personal server is selected, the terminal 600 receives, from the server 500, the network information of the image providing device 50*b* corresponding to the personal server, namely the public IP information and the private IP information, and connects to the image providing device 50 using the network information.

In addition, the terminal 600 may receive the shared content list information from the connected image providing device 50*b*, and display a shared content list screen. If the user selects any one content item from the list, the terminal 600 may make a request for transmission of the content to the connected image providing device 50*b*, and receive the content.

Thereby, the user of the terminal 600 may remotely connect to the image providing device 50*b*, which is a personal server, receive desired content and easily watch the same. Accordingly, user convenience may be enhanced.

In particular, if a web address is input on the web browser without a separate application installed on the terminal 600, the terminal 600 may be provided with a screen for connection to a personal server from the server 50*b*. After being logged in, the terminal 600 may be provided with a personal server list screen, and easily connect to the selected personal server, namely the image providing device 50*b*.

In particular, since the terminal 600 may receive private IP information of the image providing device 50*b* from the server 500, connection to the image providing device 50*b* is facilitated.

Meanwhile, the terminal 600 may conceptually include a fixed terminal or a mobile terminal.

When the terminal 600 is connected according to the web address input, the server 500 may provide a screen for connection to a personal server.

The server 500 may have a plurality of web addresses, and provide server connection screens for different user interfaces according to the respective web addresses.

For example, when a web address for a PC is input, the server 500 provides the server 500 with a server connection screen corresponding to a first resolution. When a web address for a mobile device is input, the server 500 may provide the server 500 with a server connection screen corresponding to a second resolution which is lower than the first resolution.

As another example, when a first web addresses are input, a server connection screen corresponding to the first web address may be provided to the server 500. When a second web address is input, a second server connection screen corresponding to the second web address may be provided to the server 500.

When login information is received from the terminal 600, the server 500 may provide corresponding personal server list information to the terminal 600 based on the login information.

If a personal server list corresponding to the login information is pre-stored, the server 500 may provide corresponding personal server list information to the terminal 600 based on the login information.

The memory 540 (see FIG. 19A) in the server 500 may store login information about a person, device information about the image providing device, server list information corresponding to the login information, and network information corresponding to each personal server. Herein, the network information may include the aforementioned public IP information and private IP information.

When a request for network information about a specific personal server in the personal server list is received from the terminal 600, the server 500 may perform a control operation to transmit, to the terminal 600, network information about the specific personal server, namely public IP information and private IP information. The server 500 may further transmit device information and account information (account ID).

Meanwhile, the server 500 may frequently connect to the image providing device 50*b* to receive network information about the personal server, namely the image providing device 50*b*, and perform a control operation to update the network information.

In contrast with the AP device (not shown), which is kept turned on, the image providing device 50*b* is turned on only when it is used. Accordingly, the private IP information may frequently change. To update such private IP information, the server 500 may connect to the image providing device 50*b* to receive new network information, in particular, private IP information whenever it is allowed, in particular, whenever it is turned on.

The server 500 may store the new network information as updated network information for the image providing device 50*b*.

The server 500 may transmit the updated network information to the terminal 600 when the terminal 600 requests the same. The terminal 600 may receive the updated network information from the server 500 without a separate procedure, and easily connect to the image providing device 50*b*, which is a personal server.

The server 500 may provide advertisement information when it provides information for connection to a personal server. In addition, after being logged in, the server 500 may provide the advertisement information along with the personal server information.

The server 500 may vary the type and attributes of the provided advertisement information depending on whether logging has been performed or not. That is, after logging is performed, the server 500 may provide customized advertisement information to the user.

The server 500 described in this specification may be a server enabling remote control of the image providing device. That is, the server 500 may be a remote access control (RAC) server.

The image providing device 50*b* may include a first circuit board 100*b*, which includes a broadcast receiver 105 (see FIG. 18) for receiving a plurality of broadcast signals, and a second circuit board 200*b*, which includes a storage unit 240 (see FIG. 18) having a large storage capacity.

The first circuit board 100*b* and the second circuit board 200*b* may be detachably provided in the image providing device 50*b*.

The first circuit board 100*b* and the second circuit board 200*b* may exchange data with each other via a first interface unit 125 and a third interface unit 225*b* or via a second interface unit 126 and a fourth interface unit 226.

The second circuit board 200*b* may transmit, to the first circuit board 100*b*, a signal for a background image or an image or content reproduced by the second circuit board 200*b*, and the first circuit board 100*b* may transmit, to the second circuit board 200*b*, a control signal or a broadcast signal or image to be stored.

In particular, when an input for saving a broadcast is provided, the first circuit board 100*b* may transmit a signal-processed broadcast signal or broadcast image to the second circuit board 200*b*.

The first circuit board 100*b* may be referred to as a TV board, and the second circuit board 200*b* may be referred to as a PC board.

In particular, components of the second circuit board 200*b* may be upgraded through a detachable structure.

According to an embodiment of the present invention, the image providing device 50*b* may provide a home screen including a TV screen and a PC screen as a user interface which may be conveniently used by the user.

The first circuit board 100*b* may be separated from the second circuit board 200*b*. Thereby, when one of the two circuit boards, in particular, the second circuit board 200*b* malfunctions, broadcast images may be stably provided through the first circuit board 100*b*.

The processor of the second circuit board 200*b* is better than the processor of the first circuit board 100*b* in terms of processing speed, processing capacity, and the like. Thereby, the second circuit board 200*b* may be responsible for high-performance functions, for example, image capture through a camera, gesture recognition, Web connection, and executing games. In addition, the second circuit board 200*b* may provide the first circuit board 100*b* with screens according to the respective functions.

In FIG. 17, the image providing device 50*b* is illustrated as not including either a display 180 or a camera 195. However, the image providing device 50*b* according to an embodiment of the present invention may conceptually include the display 180. If the display 180 is included in the image providing device 50*b*, the image providing device 50*b* may be referred to as an image display device.

The display 180 may be a PDP, an LCD display, an OLED display, a flexible display, or a 3D display.

The display 180 may be configured by a touchscreen to be used not only as an output device but also as an input device.

The camera 195 captures an image of the user. The camera 195 may be implemented by one camera. However, embodiments of the present invention are not limited thereto. The camera 195 may be implemented by a plurality of the cameras. The camera 195 may be embedded in an upper portion of the display 180 or may be separately disposed. Image information captured by the camera 195 may be input to the image providing device 50*b*.

Figure 18:
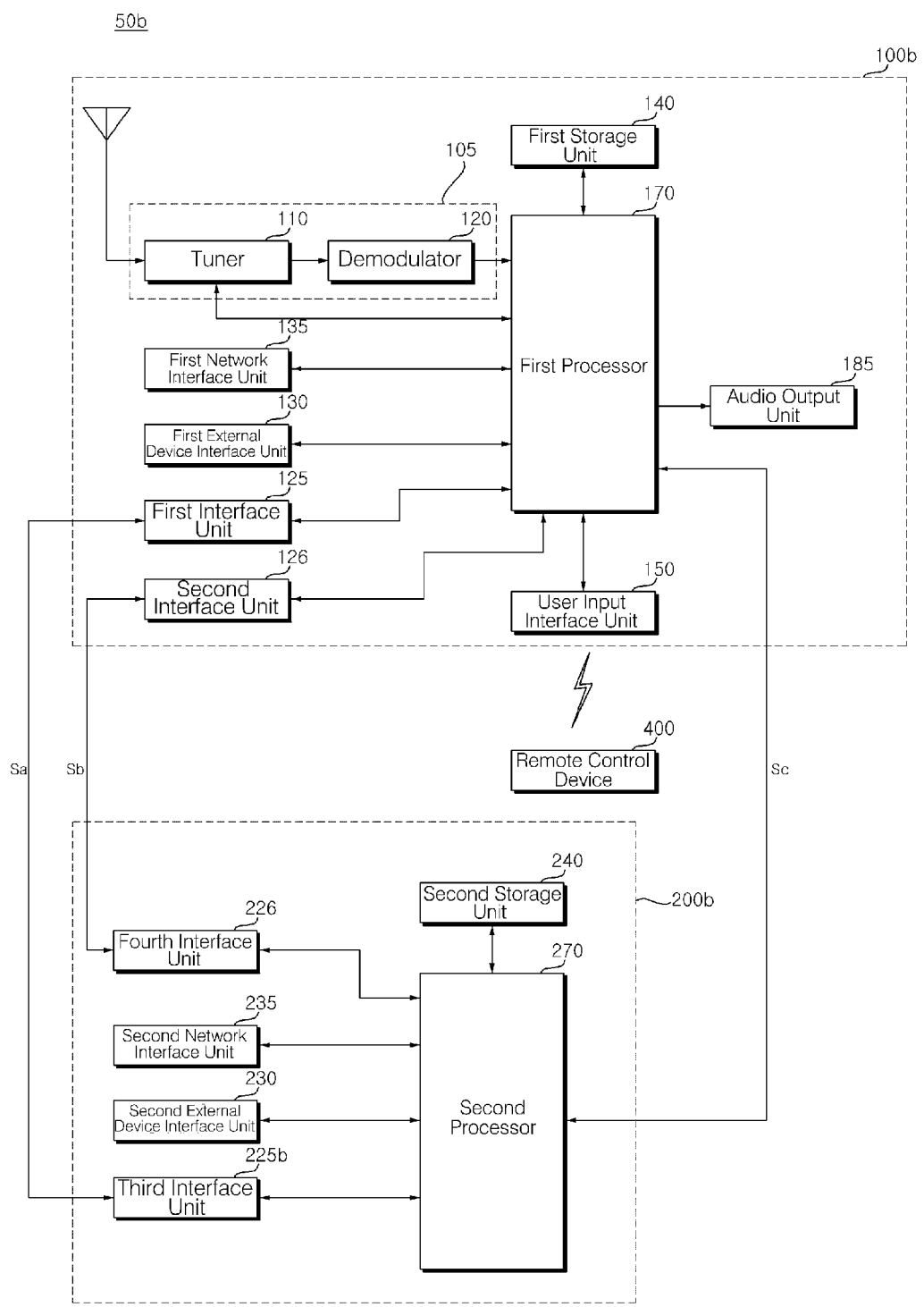
FIG. 18 is an internal block diagram illustrating an image providing device in the image providing system of FIG. 17.

FIG. 18 is an internal block diagram illustrating an image providing device in the image providing system of FIG. 17.

Referring to FIG. 18, the image providing device 50*b* according to an embodiment may include a first circuit board 100*b* and a second circuit board 200*b*.

The first circuit board 100*b* may include a broadcast receiver 105, a first interface unit 125, a second interface unit 126, a first external device interface unit 130, a first network interface unit 135, a first storage unit 140, a user input interface unit 150, a first processor 170, and an audio output unit 185.

The second circuit board 100*b* may include a third interface unit 225*b*, a fourth interface unit 226, a second external device interface unit 230, a second network interface unit 235, a second storage unit 240, and a second processor 270.

The internal block diagram of FIG. 17 looks similar to the internal block diagram of FIG. 2, but differs from the internal block diagram of FIG. 2 in that the first circuit board 100*b* includes the first interface unit 125 and the second interface unit 126, and the second circuit board 100*b* includes the third interface unit 225*b* and the fourth interface unit 226.

Hereinafter, the aforementioned differences will be mainly described.

The first interface unit 125 exchanges data with the third interface unit 225b of the second circuit board 200b through a first line Sa.

In particular, when an input for saving a broadcast is provided, the first interface unit 125 may transmit, to the third interface unit 225b, a first broadcast signal among a plurality of broadcast signals signal-processed by the first processor 170.

The first interface unit 125 may receive a reproduced broadcast signal or broadcast image from the third interface unit 225b. Alternatively, the first interface unit 125 may receive a background image.

The second interface unit 126 may exchange data with the fourth interface unit 226 of the second circuit board 200b through a second line Sb.

In particular, when an input for saving broadcast is provided, the second interface unit 126 may transmit, to the fourth interface unit 226, a second broadcast signal among a plurality of broadcast signals signal-processed by the first processor 170.

Data communication between the first interface unit 125 and the third interface unit 225b may be different from data communication between second interface unit 126 and fourth interface unit 226.

For example, data communication between first interface unit 125 and third interface unit 225b may be Ethernet-based data communication, and data communication between the second interface unit 126 and the fourth interface unit 226 may be USB-based data communication. That is, the first interface unit 125 and the third interface unit 225b may be provided with an Ethernet terminal, and the second interface unit 126 and the fourth interface unit 226 may be provided with a USB terminal.

The first processor 170 may exchange a control signal with the second processor 270 through a third line Sc. For example, the first processor 170 and the second processor 270 may transmit a control signal to each other through High Definition Multimedia Interface (HDMI) communication.

If an input for saving a plurality of channels is provided, the first processor 270, perform signal processing on the plurality of broadcast signals received the broadcast receiver 105, control a first broadcast signal to be transmitted to the second circuit board 200b via the first interface unit 125 among the plurality of broadcast signals, and control a second broadcast signal to be transmitted to the second circuit board 200b via the second interface unit 126 among the plurality of broadcast signals.

In addition, the first processor 170 may control the image providing device 50b according to a user command input via the user input interface unit 150 or an internal program.

The third interface unit 225b in the second circuit board 200b exchanges data with the first interface unit 125 of the first circuit board 100b, and the fourth interface unit 226 exchanges data with the second interface unit 126 of the first circuit board 100b.

When an input for saving broadcast is provided, the third interface unit 225b may receive a first broadcast signal from the first interface unit 125 of the first circuit board 100b among a plurality of broadcast signals signal-processed by the first processor 170, and the fourth interface unit 226 may receive a second broadcast signal from the second interface unit 126 of the first circuit board 100b among a plurality of broadcast signals signal-processed by the second processor 270.

When an input for playing broadcast is provided, the third interface unit 225b or the fourth interface unit 226 may transmit at least one part of first and second broadcast signals signal-processed by the second processor 270 or at least one part of first and second broadcast images to the first interface unit 125 or second interface unit 126 of the first circuit board 100b.

Meanwhile, the third interface unit 225b may transmit a background image to the first interface unit 125 of the first circuit board 100b to provide a home screen.

A voice signal processed by the second processor 270 may be transmitted to the first circuit board 100b via the third interface unit 225b, and output through the audio output unit 285 in the first circuit board 100b in the form of sound.

The block diagram of the image providing device 50b shown in FIG. 18 is simply illustrative. Constituents of the block diagram may be integrated, added or omitted according to the specifications of the image providing device 50b. That is, two or more constituents may be combined into one constituent, or one constituent may be subdivided into two or more constituents, when necessary. In addition, the function performed in each block is simply illustrative, and it should be noted that specific operations or devices of the blocks do not limit the scope of the present invention.

Figure 19:
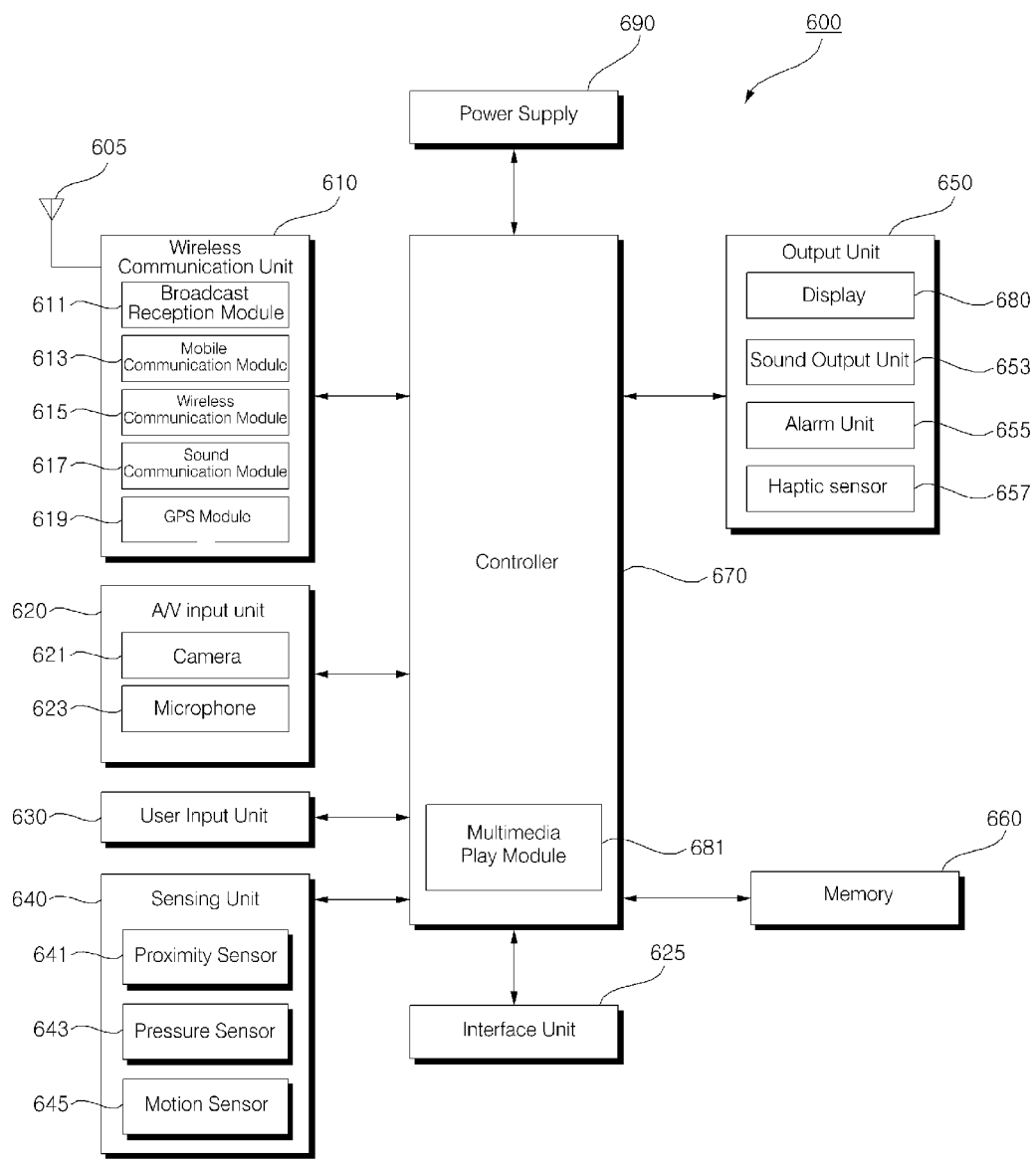
FIG. 19 is an internal block diagram illustrating the terminal of FIG. 17.

The internal block diagram of the first processor may be identical to the example of FIG. 3. FIG. 19 is an internal block diagram of the terminal of FIG. 17.

Referring to the figure, the terminal 600 may include a mobile terminal which is movable.

The mobile terminal 600 may include a wireless communication unit 610, an audio/video (A/V) input unit 620, a user input unit 630, a sensing unit 640, and an output unit 650, a memory 660, an interface unit 625, a controller 670 and a power supply 690.

The wireless communication unit 610 may include a broadcast reception module 611, a mobile communication module 613, a wireless Internet module 615, a sound communication unit 617, and a GPS module 619.

The broadcast reception module 611 may receive at least one of a broadcast signal and broadcast-related information from an external broadcast management server over a broadcast channel Herein, the broadcast channel may include a satellite channel and a terrestrial channel.

The broadcast signal and/or broadcast-related information received through the broadcast reception module 611 may be stored in the memory 660.

The mobile communication module 613 transmits and receives a radio signal to and from at least one of a base station, an external terminal and a server over a mobile communication network. Herein, the wireless signal may include a voice call signal, a video call signal, or various types of data according to transmission and reception of a text/multimedia message.

The wireless Internet module 615, which refers to a module for wireless Internet access, may be installed inside or outside the mobile terminal 600. For example, the wireless Internet module 615 may perform Wi-Fi-based wireless communication or Wi-Fi Direct-based wireless communication.

The sound communication unit 617 may perform sound communication. In the sound communication mode, the sound communication unit 617 may add data of predetermined information to audio data which is to be output and output sound. In addition, in the sound communication mode, the sound communication unit 617 may extract predetermined information from received sound.

Applicable short-range communication technologies may include Bluetooth, RFID (radio frequency identification), IrDA (Infrared Data Association), UWB (Ultra Wideband) and ZigBee.

The Global Positioning System (GPS) module 619 may receive location information from a plurality of GPS satellites.

The A/V input unit 620 is used for input of an audio signal or a video signal and may include a camera 621 and a microphone 623.

The user input unit 630 generates key input data input by the user to control operation of a terminal of the user. To this end, the user input unit 630 may include a keypad, a dome switch, and a touchpad (resistive touchpad/capacitive touchpad). In particular, a layered architecture formed by the touchpad and the display 180 may be referred to as a touchscreen.

The sensing unit 640 may generate a sensing signal for controlling operation of the mobile terminal 600 by sensing the current state of the mobile terminal 600, for example by sensing whether the mobile terminal 600 is in the open or closed position, where the mobile terminal 600 is located, and whether the user contacts the mobile terminal 600.

The sensing unit 640 may include a proximity sensor 641, a pressure sensor 643 and a motion sensor 645. The motion sensor 645 may employ an acceleration sensor, a gyro sensor, a gravity sensor and the like to sense movement or location of the mobile terminal. In particular, the gyro sensor, which is used to measure an angular speed, may sense orientation (angle) of the mobile terminal with respect to a reference direction.

The output unit 650 may include a display 680, an audio output unit 653, an alarm unit 655, and a haptic module 657.

The display 680 outputs and displays information processed by the mobile terminal 600.

As described above, if the display 680 forms a layered architecture with the touchpad to implement a touchscreen, the display 680 may be used not only as an output device but also as an input device for input of information according to user touch.

The audio output unit 653 outputs audio data received from the wireless communication unit 610 or stored in the memory 660. The audio output unit 653 may include a speaker and a buzzer.

The alarm unit 655 outputs a signal for reporting occurrence of an event in the mobile terminal 600. For example, the alarm unit 655 may output a signal in the form of vibration.

The haptic module 657 generates various haptic effects which may be felt by the user. A typical example of the haptic effects generated by the haptic module 657 is vibration.

The memory 660 may store a program for processing and control of the controller 670, and function to temporarily store input data or output data (e.g., a phonebook, a message, a still image, a moving image, etc.).

The interface unit 625 serves as an interface for all devices connected to the mobile terminal 600. The interface unit 625 may receive data or power from external devices and transfer the same to the internal constituents of the mobile terminal 600, and allow the data in the mobile terminal 600 to be transmitted to external devices.

The controller 670 typically controls operations of the aforementioned respective elements, thereby controlling overall operation of the mobile terminal. For example, the controller 670 may perform control or processing related to voice communication, data communication, video communication, and the like. The controller 670 may also include a multimedia playback module 681 to reproduce multimedia. The multimedia playback module 681 may be provided in the controller 670 as hardware or may be configured separately from the controller 670.

The power supply 690 supplies power necessary for operations of the respective constituents according to control of the controller 670 when external power or internal power is applied thereto.

The block diagram of the mobile terminal 600 shown in FIG. 19 is simply illustrative. The respective constituents of the block diagram may be integrated, added or omitted according to the specifications of the mobile terminal 600. That is, two or more constituents may be combined into one constituent, or one constituent may be subdivided into two or more constituents, when necessary. In addition, the function performed in each block is simply illustrative, and it should be noted that specified operations or devices of the blocks do not limit the scope of the present invention.

FIGS. 20A to 22C illustrate operation of the image providing device of FIG. 17.

Figure 20A:
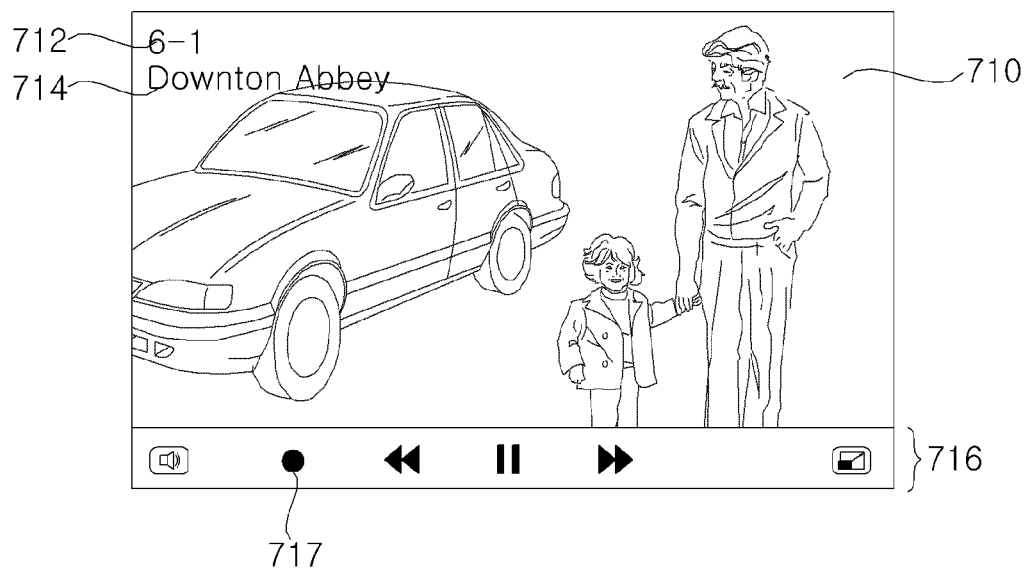
FIG. 20A to 23C illustrate operation of the image providing device of FIG. 17.

FIG. 20A illustrates a broadcast image 710 and a broadcast image related menu 716 according to a first broadcast signal.

The first processor 170 of the first circuit board 100b may perform signal processing on a received broadcast signal of channel 6-1 to provide a first broadcast image 710. In addition, the first processor 170 may provide the broadcast image related menu 716. The broadcast image-related menu 716 may include, for example, a record button 717.

The display 180 may display the first broadcast image 710 and the broadcast image-related menu 716 which are provided thereto.

When the record button 717 is operated by user input, the first processor 170 of the first circuit board 100b controls the received broadcast signal of channel 6-1 to be stored. For example, the received broadcast signal of channel 6-1 may be signal-processed, and then stored in the second storage unit 240 in the second circuit board 200b via the first interface unit 125.

Figure 20B:
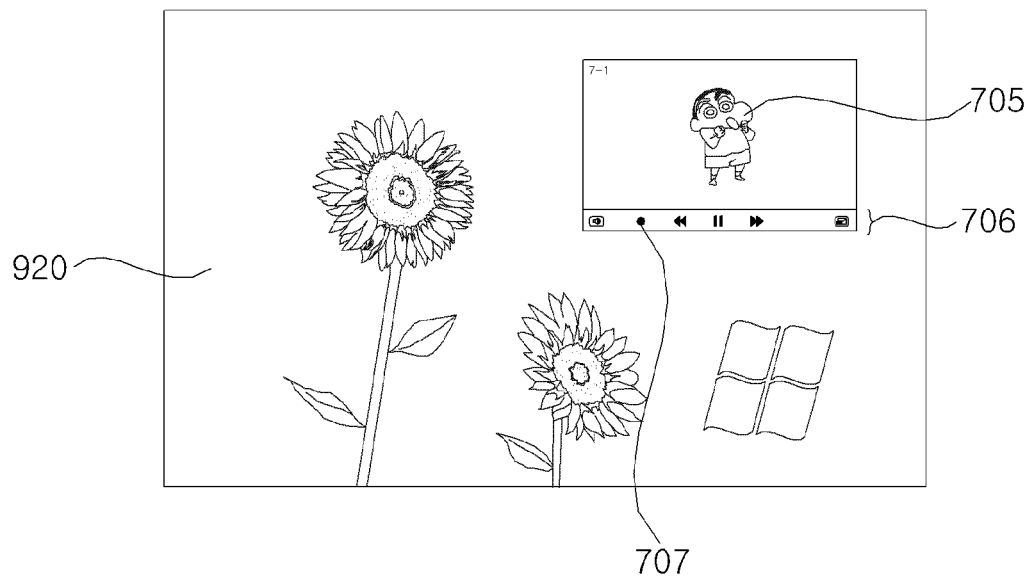

FIG. 20B illustrates a background image 920 executed by the second processor 270. The figure shows a second broadcast image 705 and a broadcast image related menu 706, which are provided in the background image 920 in the form of PIP.

The first processor 170 of the first circuit board 100b may perform signal processing on a received broadcast signal of channel 7-1 to provide a second broadcast image 705. In addition, the second processor 270 of the second circuit board 200b may provide a background image 920.

The display 180 may display the background image 920, second broadcast image 705 and broadcast image related menu 706 which are provided thereto.

When the record button 707 in the broadcast image related menu 706 is operated by user input, the first processor 170 of the first circuit board 100b controls the received broadcast signal of channel 7-1 to be stored. For example, the received broadcast signal of channel 7-1 may be signal-processed, and then stored in the second storage unit 240 in the second circuit board 200b via the second interface unit 126.

Figure 20C:
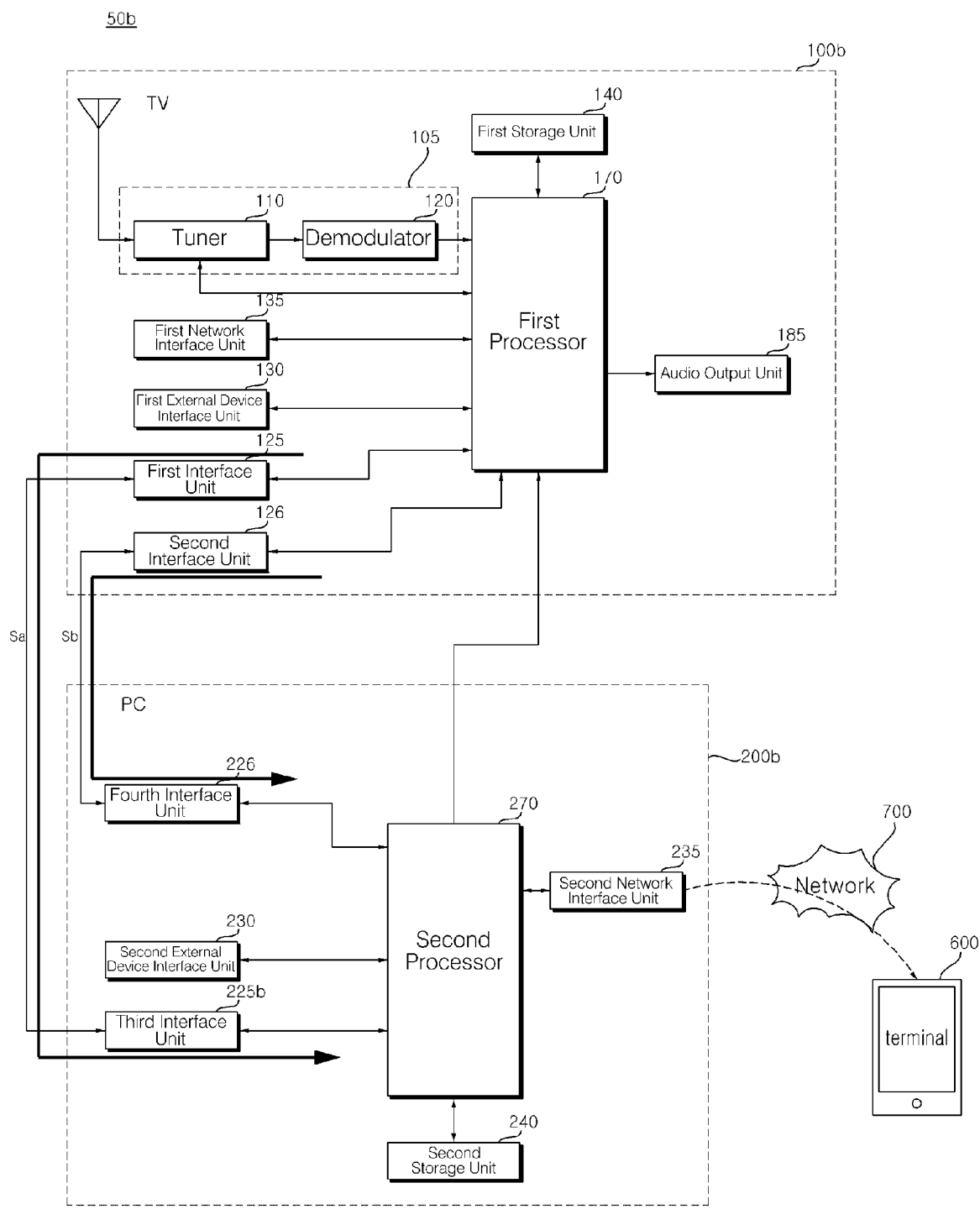

FIG. 20C illustrates a path along which a plurality of broadcast signals selected in FIGS. 20A and 20C is transmitted to the second circuit board 200b.

The broadcast receiver 105 receives a plurality of broadcast signals of channels 6-1 and 7-1, and the first processor 170 performs signal processing on the plurality of broadcast signals.

The signal-processed broadcast signal of channel 6-1 may be input to the second processor 270 through the third interface unit 225b via the first interface unit 125, signal-processed, and then stored in the second processor 270.

The signal-processed broadcast signal of channel 7-1 may be input to the second processor 270 through the fourth interface unit 226 via the second interface unit 126, signal-processed, and then stored in the second processor 270.

Thereby, a plurality of broadcast signals may be easily stored in the second processor 270, which has a large storage capacity.

The first processor 170 may monitor the resource of the first circuit board 100b, and the second processor 270 may monitor the resource of the second circuit board 200b. At least one of the first and second processors 170, 270 may change the storage location of the first and second broadcast signals based on at least one of the resources of the first and second circuit boards 100, 200.

At least one of the first and second processors 170, 270 may control the first and second broadcast signals to be stored in the second storage unit 240 of the second circuit board 200b. Then, at least one of the first and second processors 170, 270 may control one of the first and second broadcast signals to be stored in the storage unit 140 of the first circuit board 100b and the other one of the broadcast signals to be stored in the second storage unit 240 of the second circuit board 200b, based on at least one of the resources of the first and second circuit boards 100, 200.

Figure 20D:
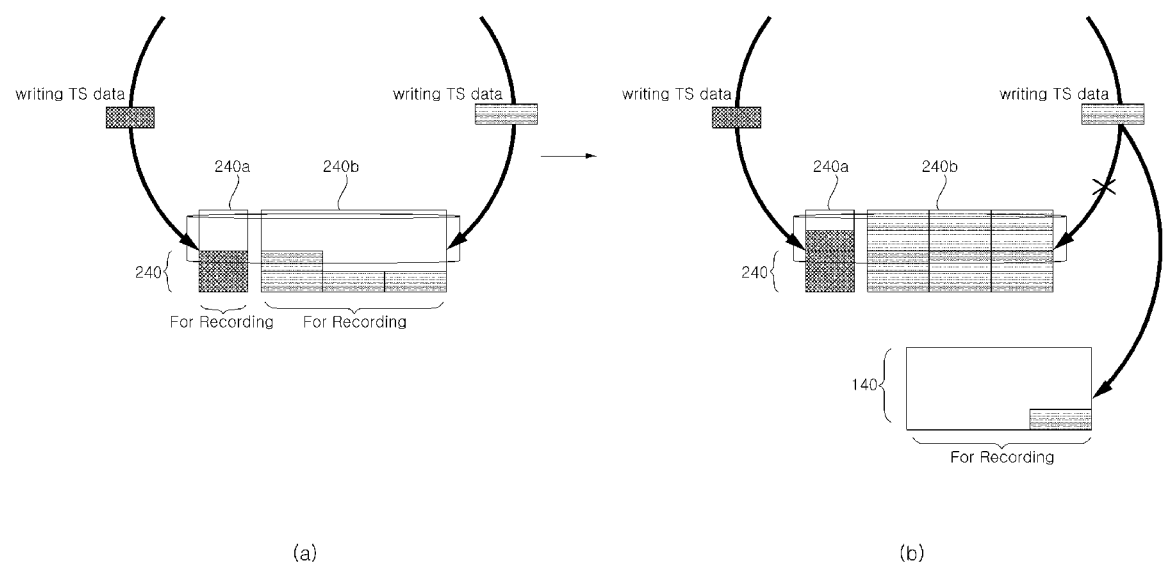

FIG. 20D(a) illustrates a case where the first broadcast signal (the broadcast signal of channel 6-1) and a second broadcast signal (the broadcast signal of channel 7-1) are stored in a first area 240a and second area 240b in the second storage unit 240, respectively. In particular, TS data of the broadcast signals are stored in the first area 240a and the second area 240b.

FIG. 20D(b) illustrates a case where the second broadcast signal is stored in the first storage unit 140 in the first circuit board 100b when the storage space in the second storage unit 240 is insufficient for the second broadcast signal. Thereby, the broadcast signal may be efficiently stored.

As described above, the first processor 170 may monitor the resource of the first circuit board 100b, particularly, the storage capacity of the storage unit 140, and the second processor 270 may monitor the resource of the first circuit board 100b, particularly, the storage capacity of the second storage unit 240.

Meanwhile, the first processor 170 may monitor the signal processing capacity thereof and the storage capacity of a buffer (not shown), which is a temporary storage space, and the second processor 270 may monitor the signal processing capacity thereof and the storage capacity of a buffer (not shown), which is a temporary storage space.

Figure 20E:
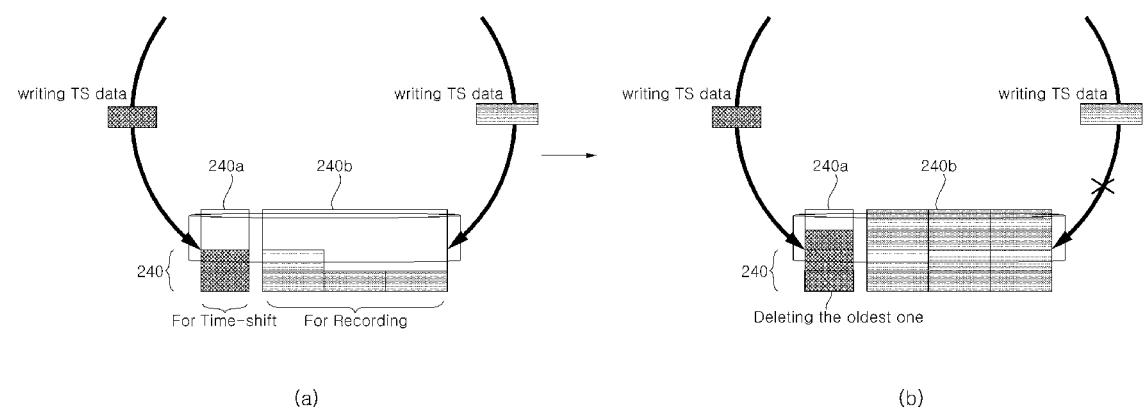

FIG. 20E(a) illustrates a case where a first broadcast signal (the broadcast signal channel 6-1) and a second broadcast signal (the broadcast signal of channel 7-1) are stored in the first area 240a and the second area 240b in the second storage unit 240, respectively. In particular, TS data of the broadcast signals are stored in the first area 240a and the second area 240b.

FIG. 20E(a), which is similar to FIG. 20D(a), illustrates a case where the first broadcast signal is temporarily stored in the second storage unit 240 according to a time machine function or time shift function.

FIG. 20E(b) illustrates sequentially deleting first broadcast signals, which are temporarily stored, in order from the oldest signal when the storage space for the second broadcast signal in the second storage unit 240 is insufficient. Thereby, a storage space for the second broadcast signal may be secured, and the second broadcast signal may be stored in the secured space. Thereby, broadcast signals may be efficiently stored.

In the example of FIG. 20E(b), if the storage space for the second broadcast signal is insufficient, the second broadcast signal may be stored in the first storage unit 140 in the first circuit board 100b, as in the case of FIG. 20D(b).

Figure 21A:
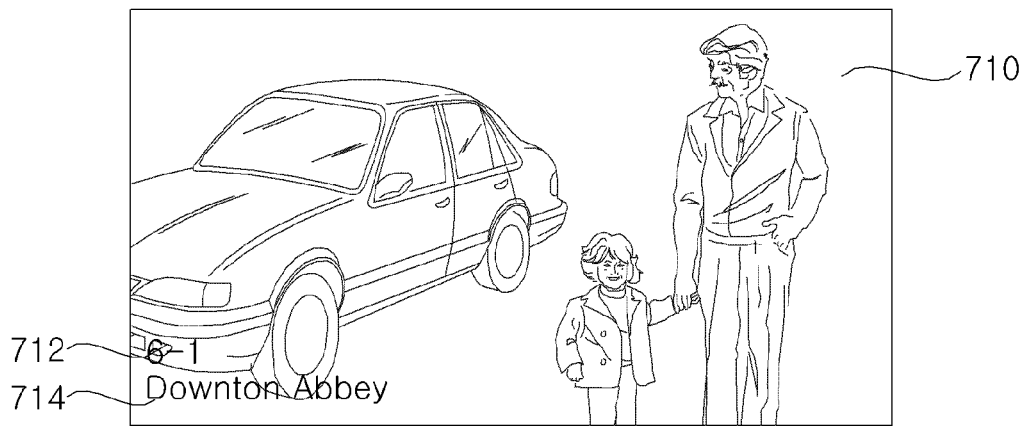

FIG. 21A illustrates an exemplary broadcast image 710 which is signal-processed and output by the first processor 170.

The first processor 170 may receive a broadcast signal, perform signal processing on the broadcast signal, extract a broadcast image and various kinds of information from the broadcast signal, and provide the broadcast image 710 including the channel information (6-1) 712 and broadcast program name information (Downton Abbey) 714 to the display 180.

Figure 21B:
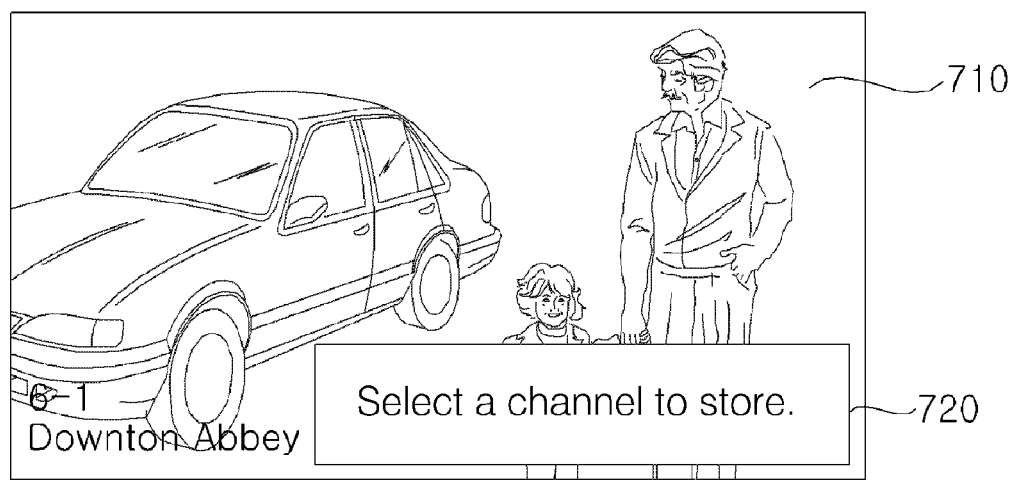

If an input for saving a broadcast is provided by user input, an object 720 for selection of a stored channel may be further provided, as shown in FIG. 21B. The first processor 170 may generate the object 720 for selection of a stored channel.

Figure 21C:
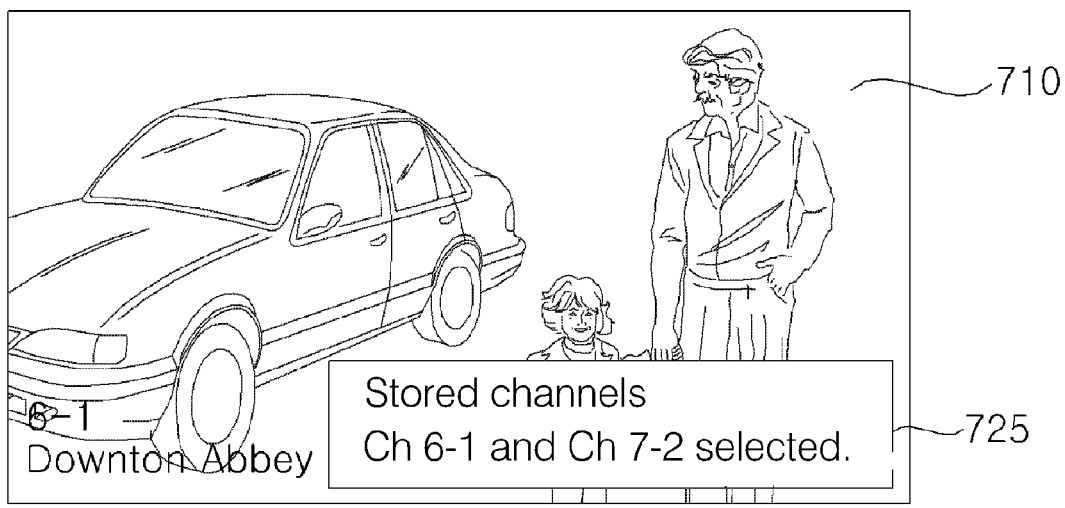

If a plurality of channels is selected by user selection, an object 725 indicating completion of selection of the plurality of channels may be further provided, as shown in FIG. 21C. The first processor 170 may generate the object 725 indicating completion of selection of the plurality of channels.

Figure 21D:
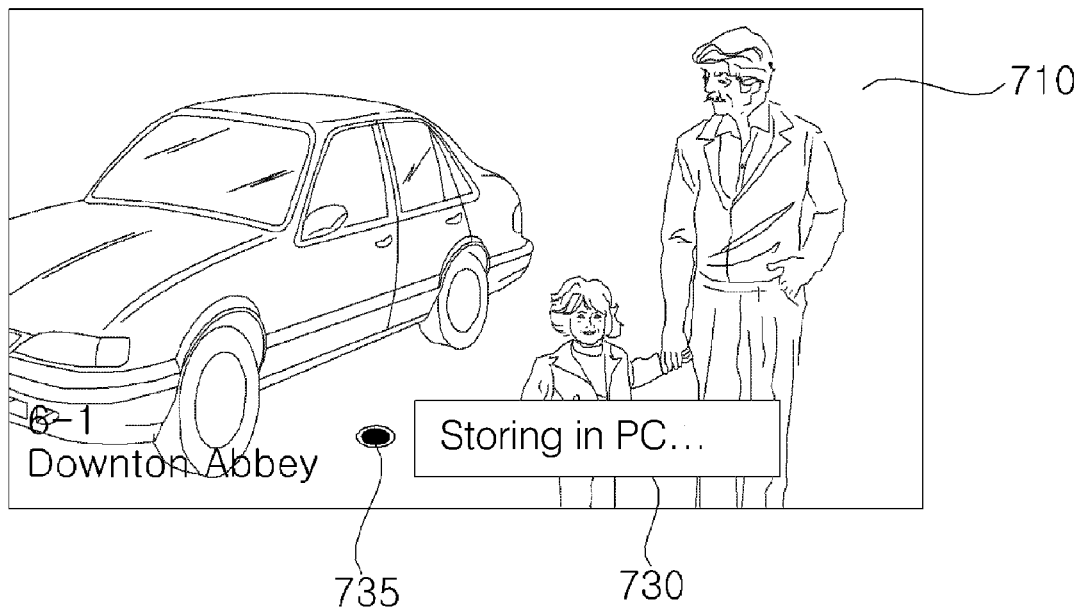

FIG. 21D illustrates an object 730 indicating that a broadcast signal or broadcast image is being stored in the second circuit board and an object 735 indicating that storage is underway.

The figure shows a text "Saving in the PC". Herein, the PC represents a PC circuit board, namely the second circuit board 200b. In particular, the PC may indicate that the received signal is being stored in the second storage unit 240 in the second circuit board 200b. Thereby, the user may easily recognize whether the signal is being stored and the storage location.

In saving broadcast, the first processor 170 may generate an object 730 indicating the storage location information for the broadcast signal and an object 735 indicating that storage is underway.

Consequently, a plurality of broadcast signals may be stored in the second storage unit 240 by sequentially passing through the broadcast receiver 105, the first processor 170, the first interface unit 125, the second interface unit 126, the third interface unit 225b, the fourth interface unit 226, and the second processor 270.

Figure 22A:
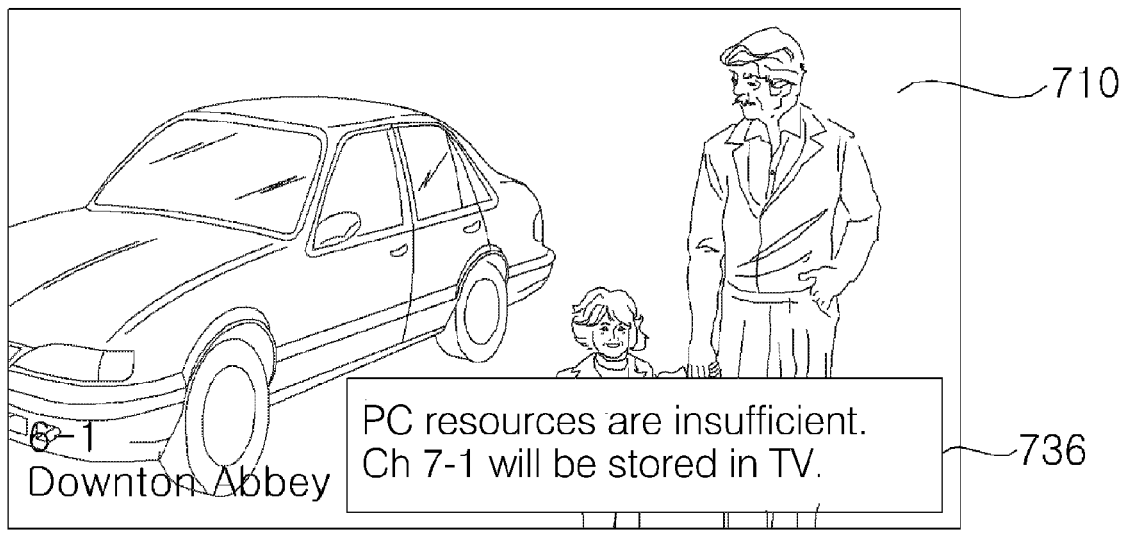

FIG. 22A illustrates providing an object 736 indicating that the resource of the second circuit board 200b is insufficient and a broadcast image 710.

As shown in FIG. 20D, if the storage space in the second storage unit 240 is insufficient, the second processor 270 may transmit a control signal to the first processor 170 to store, in the first storage unit 140 in the first circuit board 100b, a second broadcast signal among a plurality of broadcast signals.

According to the control signal, the first processor 170 may control the second broadcast signal, which is being signal-processed and provided to the second circuit board 200b to be stored in the first storage unit 140.

Figure 22B:
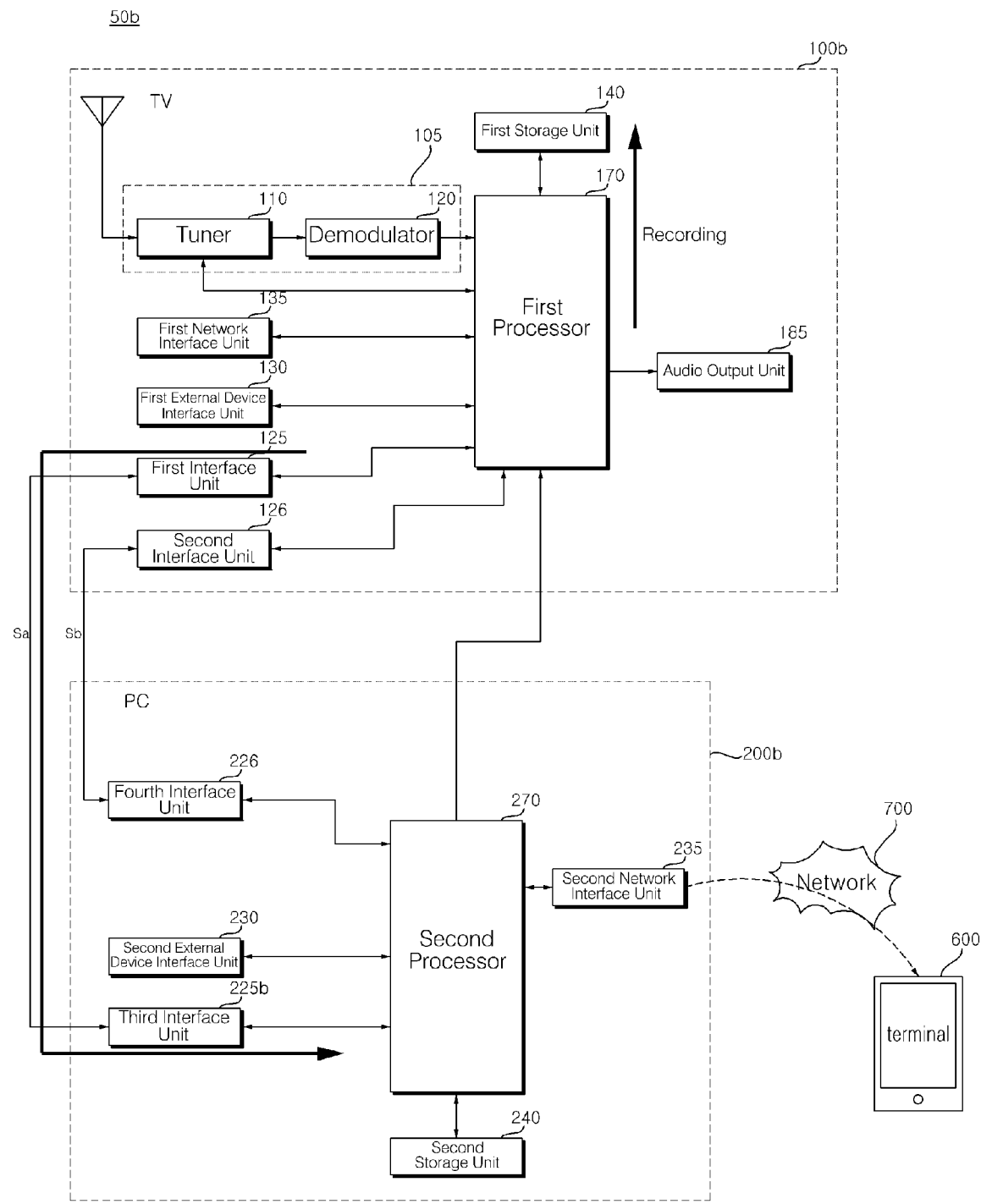

FIG. 22B illustrates that a first broadcast signal is communicated to the second circuit board via the first interface unit 125 and the third interface unit 225b, and stored in the second processor 270 and the second storage unit 240 and that a second broadcast signal is directly transmitted from the first processor 170 to the first storage unit 140 and stored in the first storage unit 140. Thereby, the broadcast signals may be efficiently stored.

Figure 23A:
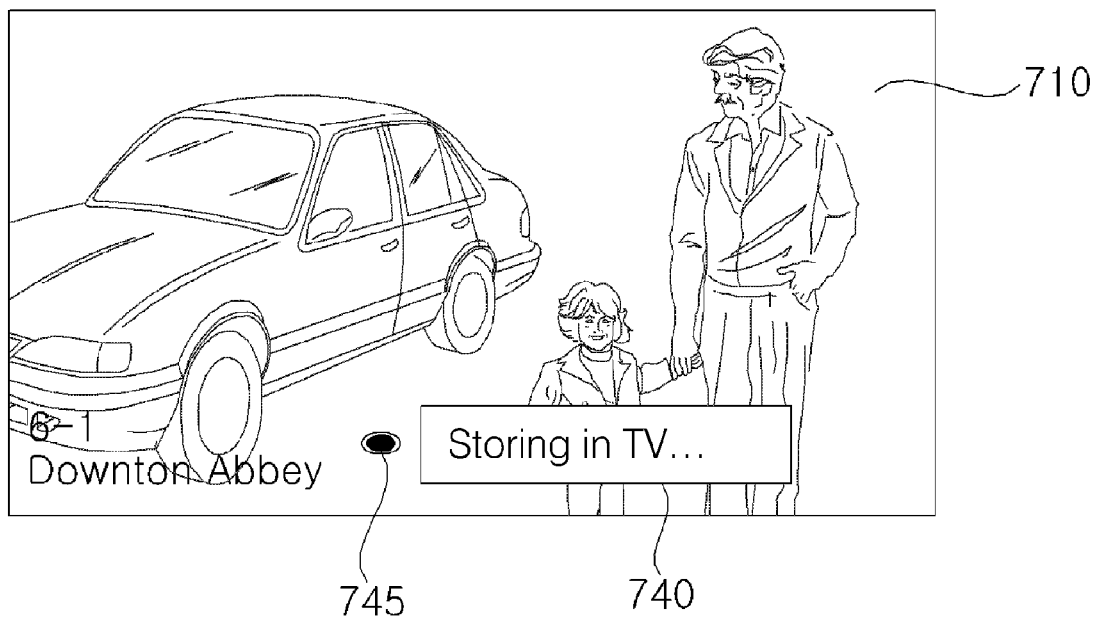

FIG. 23A illustrates an object 740 indicating that a broadcast signal or broadcast image is being stored in the first circuit board and the object 745 indicating that storage is underway.

In saving a broadcast, the first processor 170 may generate an object 740 indicating the storage location information for the broadcast signal and an object 745 indicating that storage is underway.

The figure shows text "Saving in the TV". Herein, the TV represents a TV circuit board, namely the first circuit board 100b. In particular, the TV may indicate that the received signal is being stored in the first storage unit 140 in the first circuit board 100b. Thereby, the user may easily recognize whether the signal is being stored and the storage location.

Referring to FIG. 23A, a plurality of broadcast signals is stored in the first storage unit 140 in the first circuit board.

Figure 23B:
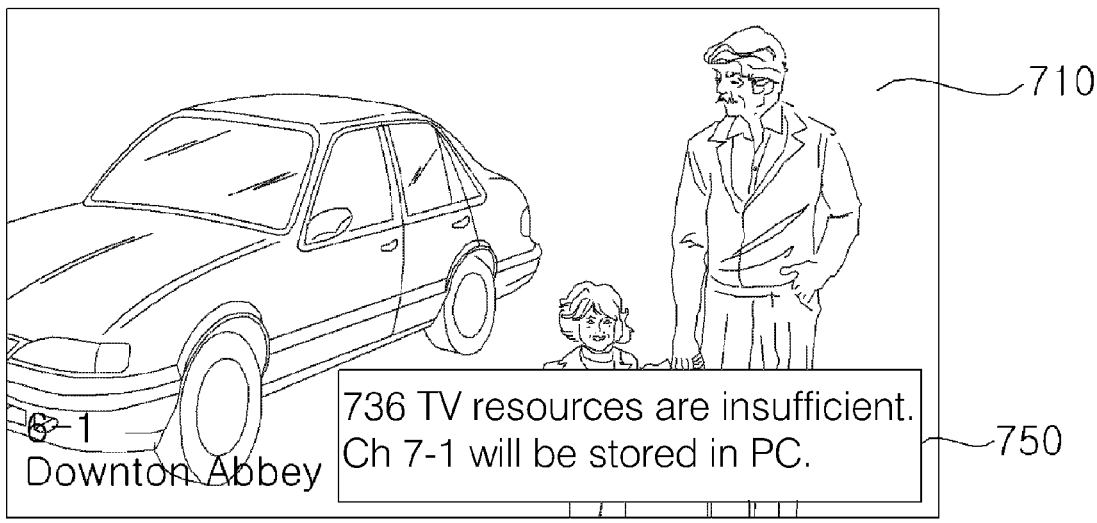

FIG. 23B illustrates providing an object 750 indicating insufficiency of the resources of the first circuit board 100b and a broadcast image 710 together.

If the storage space of the first storage unit 140 is insufficient, the first processor 170 may transmit a control signal to the second processor 270 to store, in the second storage unit 240 in the second circuit board 200b, a second broadcast signal among a plurality of broadcast signals.

According to the control signal, the second processor 270 may perform signal processing on the second broadcast signal received from the first circuit board 100b via the fourth interface unit 226, and control the second signal-processed broadcast signal to be stored in the second storage unit 240.

Figure 23C:
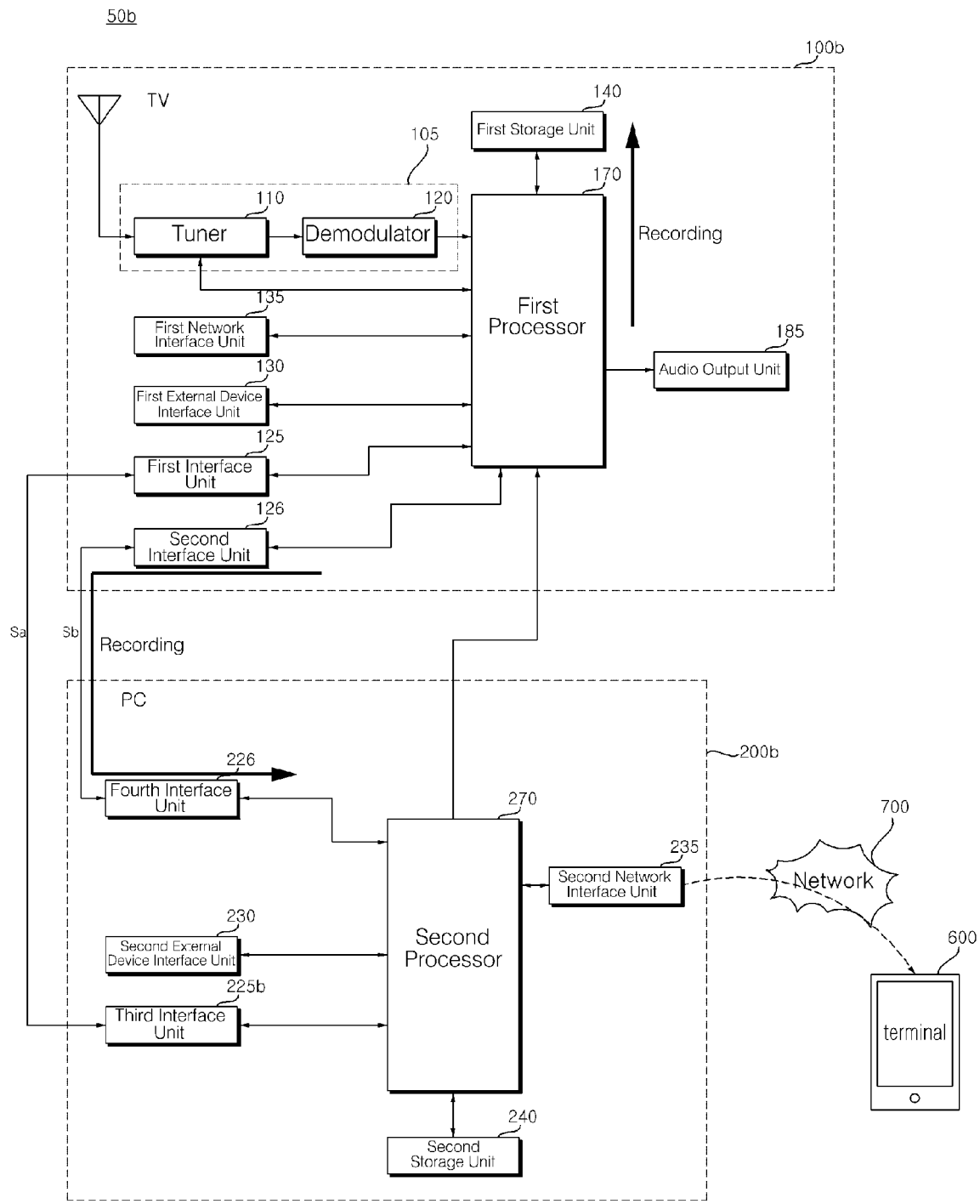

FIG. 23C illustrates that a second broadcast signal (the broadcast signal of Ch 7-1) is transmitted to the second circuit board 200b via the second interface unit 126 and the fourth interface unit 226 and stored in the second processor 270 and the second storage unit 240 and that a first broadcast signal (the broadcast signal of Ch 6-1) is directly transmitted from the first processor 170 to the first storage unit 140 and stored in the first storage unit 140. Thereby, the broadcast signals may be efficiently stored.

An operation method for the image providing apparatus according to the present invention is implementable by code which can be read by the processor on a recording medium which can be read by a processor provided to autonomous driving apparatus or vehicle. The recording medium readable by the processor includes all kinds of recording devices for storing data which can be read by the processor. Examples of the recording medium readable by the processor include ROM, RAM, CD-ROM, magnetic tape, floppy disk, and optical data storage. The method is also implementable in the form of a carrier wave such as transmission over the Internet. In addition, the recording medium readable by the processor may be distributed to computer systems connected over a network, and code which can be read by the processor in a distributed manner may be stored in the recording medium and executed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. The variant embodiments should not be individually understood from the spirit or prospect of the present invention.

The invention claimed is:

1. An image providing device comprising:
a first circuit board comprising:
a broadcast receiver to receive a broadcast signal;
a first processor to perform signal processing on the received broadcast signal; and
a first interface to transmit the signal-processed broadcast signal to a second circuit board when an input for saving broadcast is provided; and
the second circuit board comprising:
a second interface to receive the broadcast signal from the first interface unit, interface;
a memory to store the received broadcast signal; and
a second processor to control the second interface and the memory,
wherein the second processor drives a second operating system (OS) different from a first OS driven by the first processor, and executes a second OS-based application,
wherein the first interface includes:
an infrared (IR) module to receive power on or off signal; and
a radio frequency (RF) module to receive a pointing signal from a remote controller, when an input for displaying a home screen is provided:
the first processor provides a broadcast image corresponding to the broadcast signal and a pointing image based on the pointing signal, wherein the pointing image is generated by a pointing signal processor;
the second processor provides a background Image driven by the second processor, wherein the background image of the second circuit board is signal processed and then provided when the second circuit board is activated in response to the input for displaying the home screen while the broadcast image is provided by activating the first circuit board, and wherein the background image of the second circuit board is provided on the home screen when the first circuit board is activated in response to the input for displaying the home screen while the background image and relevant folders are provided by activating the second circuit board; and
at least one of the first processor or the second processor provides a home screen including the broadcast image, the pointing image, and the background image, and
wherein, when the background image is selected on the home screen based on the pointing Image, the second processor provides a background image larger than the background image, the pointing image, and a broadcast image storing folder.

2. The image providing device according to claim 1, further comprising:
a display to display a broadcast image signal-processed by the first processor; and
a speaker to output broadcast sound corresponding to the signal-processed broadcast image.

3. The image providing device according to claim 2, wherein, when the input for saving broadcast is provided while the broadcast image is displayed on the display, the first processor provides at least one of an object indicating storage location information for the broadcast signal or an object including a storage location selection item for the broadcast signal.

4. The image providing device according to claim 1, wherein the first circuit board further comprises a memory, wherein at least one of the first processor or the second processor controls the broadcast signal to be stored in the memory in the first circuit board and controls the broadcast signal to be stored in the memory in the second circuit board when there is a shortage of a storage space of the memory in the first the board.

5. The image providing device according to claim 1, wherein at least one of the first processor or the second processor further provides an application image corresponding to at least one application driven by the first processor and an application image corresponding to at least one application driven by the second processor.

6. The image providing device according to claim 5, wherein, when an application related to a stored broadcast image is executed on the home screen, at least one of the first processor or the second processor provides a stored broadcast image list,
wherein, when a predetermined broadcast item is selected from the broadcast image list, at least one of the first processor or the second processor provides the selected broadcast image.

7. The image providing device according to claim 1, wherein, when the broadcast image storing folder in the background image is selected based on the pointing image, at least one of the first processor or the second processor provides a stored broadcast image list, and
wherein, when a predetermined broadcast item is selected from the broadcast image list, at least one of the first processor or the second processor provides the selected broadcast image.

8. The image providing device according to claim 2, wherein a new event occurs in the second circuit board while the broadcast image is displayed on the display, and the first processor provides an object indicating the event.

9. The image providing device according to claim 1, further comprising:
a display to display a background image driven by the second processor,
wherein, a new event occurs in the first circuit board, and the second processor provides an object indicating the event.

10. The image providing device according to claim 2, wherein, when a pointing image is received from the second interface of the second circuit board via the first interface while the broadcast image is displayed on the display, the first processor scales the pointing image and controls the scaled pointing image to be displayed on the broadcast image in an overlapping manner.

11. The image providing device according to claim 1, further comprising:
a display to display a background image driven by the second processor,
wherein, when a pointing image is received from the first interface of the first circuit board via the second interface while the broadcast image is displayed on the display, the second processor scales the pointing image and controls the scaled pointing image to be displayed on the broadcast image in an overlapping manner.

12. An image providing device comprising:
a first circuit board comprising:
a broadcast receiver to receive a plurality of broadcast signals;
a first processor to perform signal processing on the plurality of received broadcast signals;
a first interface to transmit, to a second circuit board, a first broadcast signal among the signal-processed broadcast signals when an input for saving broadcast is provided; and
a second interface to transmit, to the second circuit board, a second broadcast signal among the signal-processed broadcast signals; and
the second circuit board comprising:
a third interface to receive the first broadcast signal from the first interface;
a fourth interface to receive the second broadcast signal from the second interface;
a memory to store the received first and second broadcast signals; and
a second processor to control the third and fourth interfaces and the memory, wherein the first interface includes:
an infrared (IR) module to receive power on or off signal; and
a radio frequency (RF) module to receive a pointing signal from a remote controller, when an input for displaying a home screen is provided:
the first processor provides a broadcast image corresponding to the first or second broadcast signal and a pointing image based on the pointing signal, wherein the pointing image is generated by a pointing signal processor;
the second processor provides a background image driven by the second processor, wherein the background image of the second circuit board is signal processed and then provided when the second circuit board is activated in response to the input for displaying the home screen while the broadcast image is provided by activating the first circuit board, and wherein the background image of the second circuit board is provided on the home screen when the first circuit board is activated in response to the input for displaying the home screen while the background image and relevant folders are provided by activating the second circuit board; and
at least one of the first processor or the second processor provides a home screen including the broadcast image, the pointing image, and the background image, and
wherein, when the background image is selected on the home screen based on the pointing image, the second processor provides a background image larger than the background image, the pointing image, and a broadcast image storing folder.

13. The image providing device according to claim 12, wherein the second circuit board further comprises:
a network interface to transmit at least one of the received first or second broadcast signal to an outside network.

14. The image providing device according to claim 12, wherein the first circuit board further comprises a memory,
wherein the first processor monitors a resource of the first circuit board, and the second processor monitors a resource of the second circuit board,
wherein at least one of the first or second processor varies a storage location for the first and second broadcast signals based on at least one of the resources of the first and second circuit boards.

15. The image providing device according to claim 14, wherein at least one of the first or second processor controls the first and second broadcast signals to be stored in the memory of the second circuit board and then perform a control operation based on the resources of the first and second circuit boards to store one of the first and second broadcast signals in the memory of the first circuit board and the other one of the first and second broadcast signals in the memory of the second circuit board.

16. The image providing device according to claim 12, wherein a data communication scheme between the first interface and the third interface is different from a data communication scheme between the second interface and the fourth interface.

17. The image providing device according to claim 12, wherein the second processor drives a second operating system (OS) different from a first OS driven by the first processor, and executes a second OS-based application.

18. The image providing device according to claim 12, further comprising:
   a display to display a broadcast image for the first broadcast signal; and
   a speaker to output broadcast sound corresponding to the broadcast image.

19. The image providing device according to claim 18, wherein, when the input for saving broadcast is provided while the broadcast image is displayed on the display, the first processor provides an object indicating storage location information about the first and second broadcast signals.

* * * * *